US007975314B2

(12) United States Patent
Ando

(10) Patent No.: US 7,975,314 B2
(45) Date of Patent: Jul. 5, 2011

(54) SCANNING PROBE MICROSCOPE AND ACTIVE DAMPING DRIVE CONTROL DEVICE

(75) Inventor: Toshio Ando, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 255 days.

(21) Appl. No.: 12/439,700

(22) PCT Filed: Jul. 27, 2007

(86) PCT No.: PCT/JP2007/064731
§ 371 (c)(1),
(2), (4) Date: May 26, 2009

(87) PCT Pub. No.: WO2008/029561
PCT Pub. Date: Mar. 13, 2008

(65) Prior Publication Data
US 2009/0276924 A1   Nov. 5, 2009

(30) Foreign Application Priority Data

Sep. 6, 2006   (JP) .................................. 2006-241920

(51) Int. Cl.
*G01Q 10/06* (2010.01)
(52) U.S. Cl. ........... 850/4; 850/1; 310/316.01; 318/135; 318/560; 318/632
(58) Field of Classification Search .................. 850/1, 4, 850/52; 310/316.01; 318/135, 560, 632
See application file for complete search history.

(56) References Cited

U.S. PATENT DOCUMENTS 5,714,831 A * 2/1998 Walker et al. ............ 310/316.01

(Continued)

FOREIGN PATENT DOCUMENTS

JP   2005-190228 A   7/2005

OTHER PUBLICATIONS

Kodera; "Active Damping of the scanner for high-speed atomic force microscopy", Review of Scientific Instruments. May 2005, vol. 76, No. 5.

(Continued)

*Primary Examiner* — Jack I Berman
(74) *Attorney, Agent, or Firm* — Pearne & Gordon LLP

(57) ABSTRACT

There is provided a scanning probe microscope that allows active damping to be advantageously carried out.

A Z scan control section functions as a driving control section to control a Z scanner that is a controlled object. Driving control is performed by supplying the controlled object with a driving signal processed by an adjustment function. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function. The adjustment function processing is configured so as to execute processing of the simulated transfer function G(s) on the driving signal, to execute processing of an inverse target transfer function K(s) corresponding to the inverse of the target transfer function on an output from the G(s), to determine the difference between the driving signal and the output of K(s), to apply a gain g to the difference, and to add the signal after the gain is applied to the driving signal. Therefore, the output from the G(s) approximates to the target transfer function which is the inverse of the K(s).

16 Claims, 15 Drawing Sheets

U.S. PATENT DOCUMENTS 7,017,398 B2 * 3/2006 Adderton et al. ............... 73/105
7,631,546 B2 * 12/2009 Masser ........................... 73/105
2007/0214864 A1 * 9/2007 Proksch .......................... 73/105

OTHER PUBLICATIONS

International Search Report for PCT/JP2007/064731, Oct. 19, 2007.

* cited by examiner

[Fig.1]
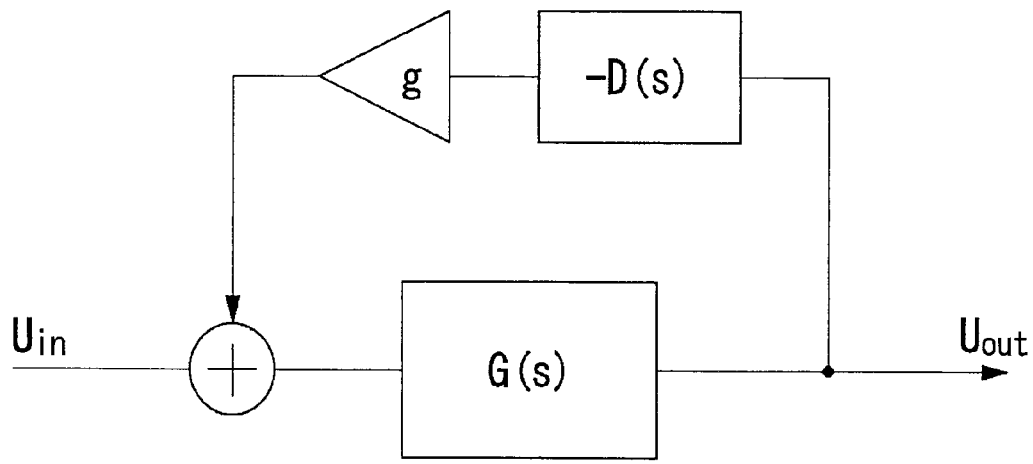
[Fig.2]
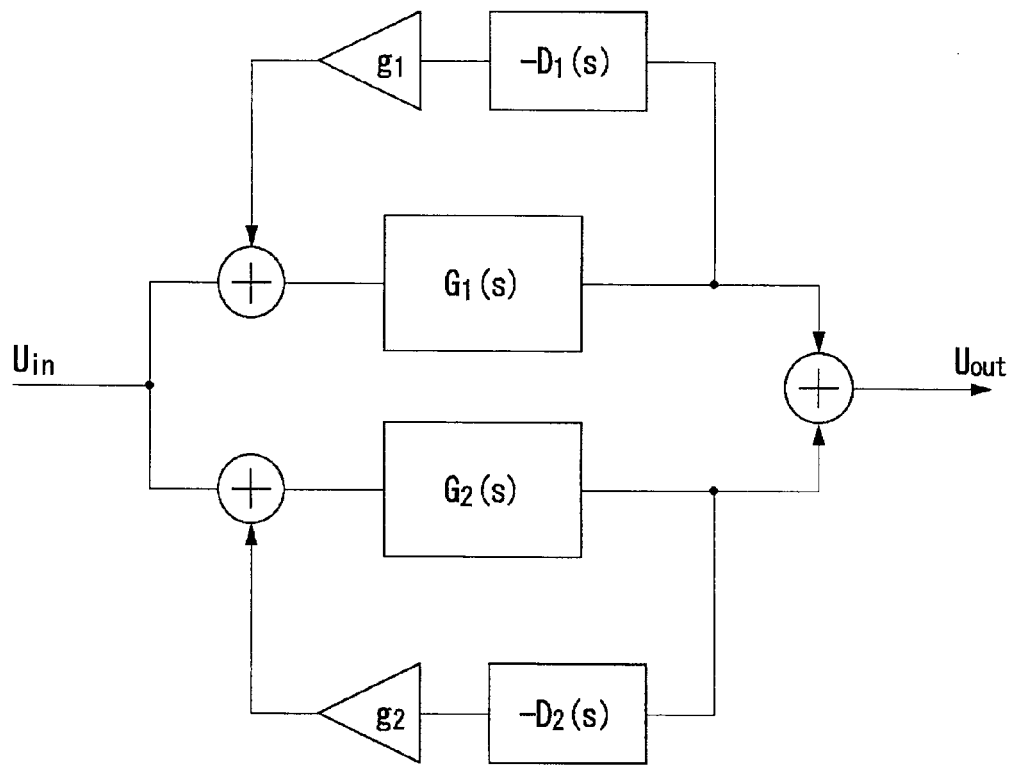

[Fig. 3]
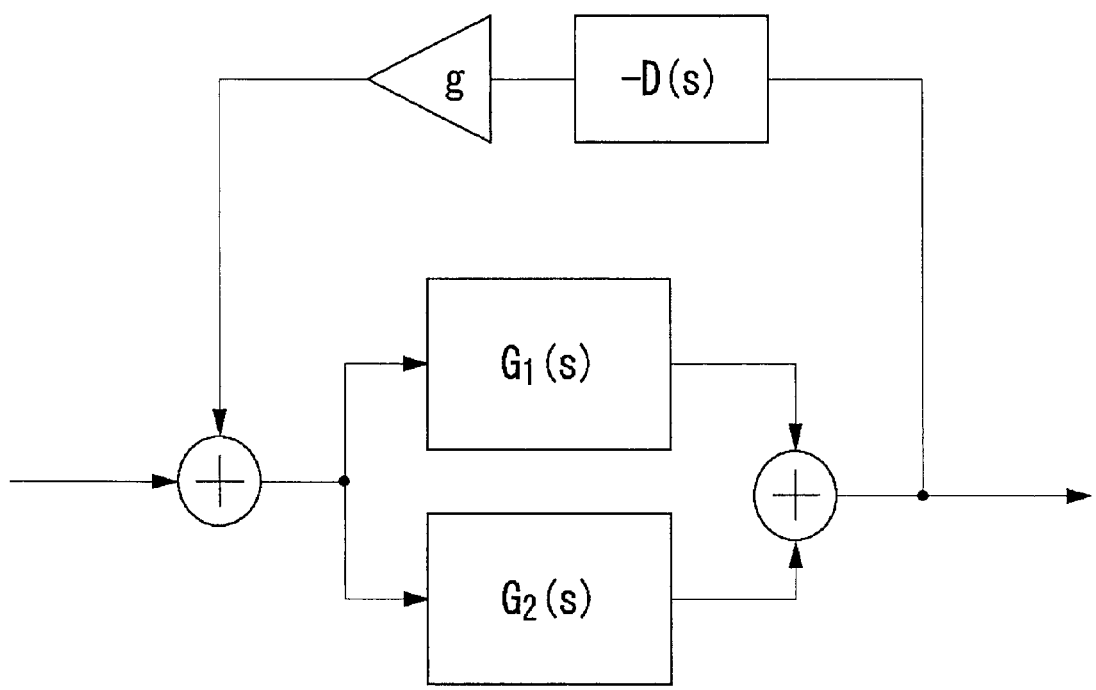

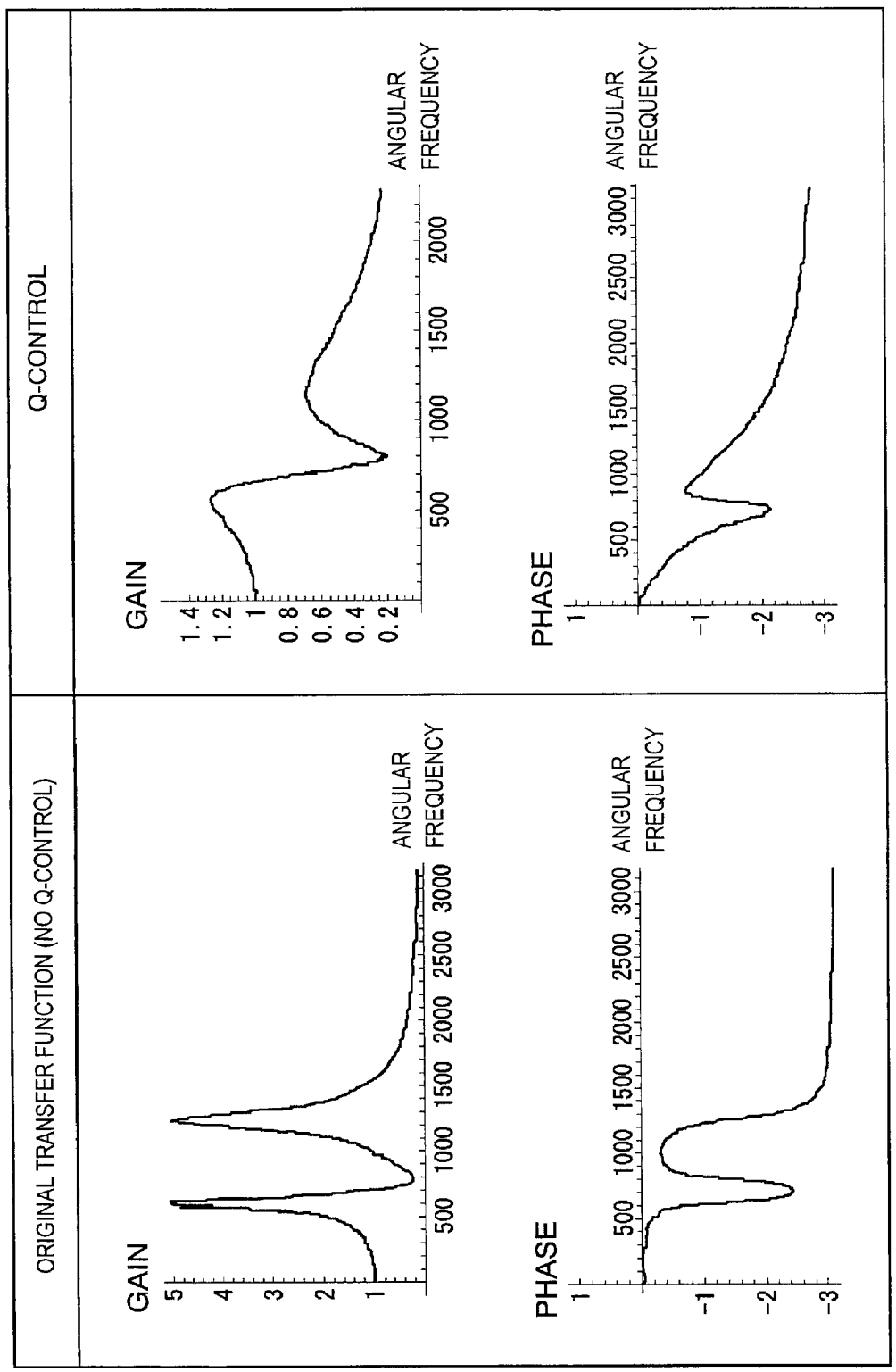
[Fig. 4]

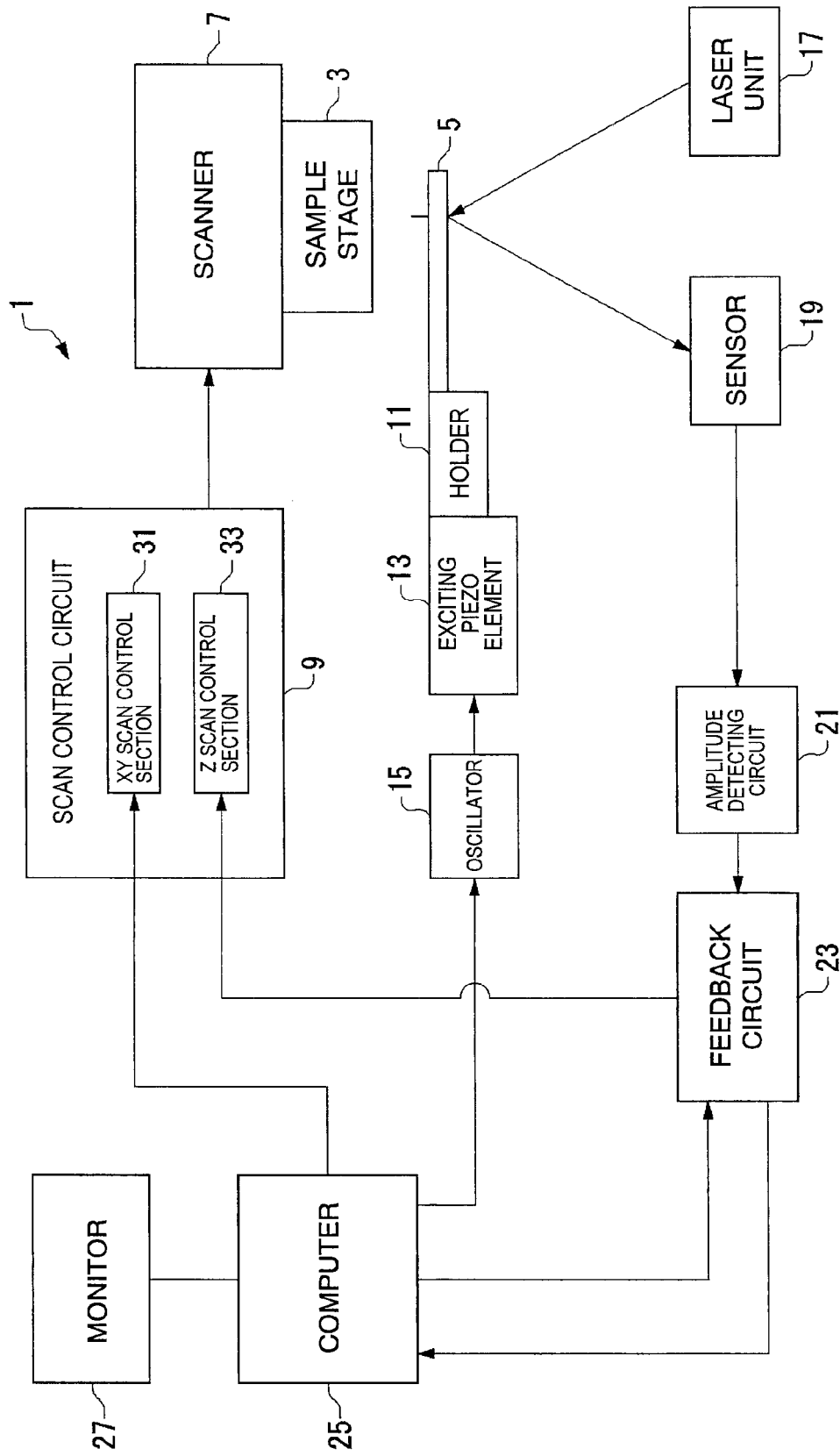
[Fig. 5]

[Fig. 6]
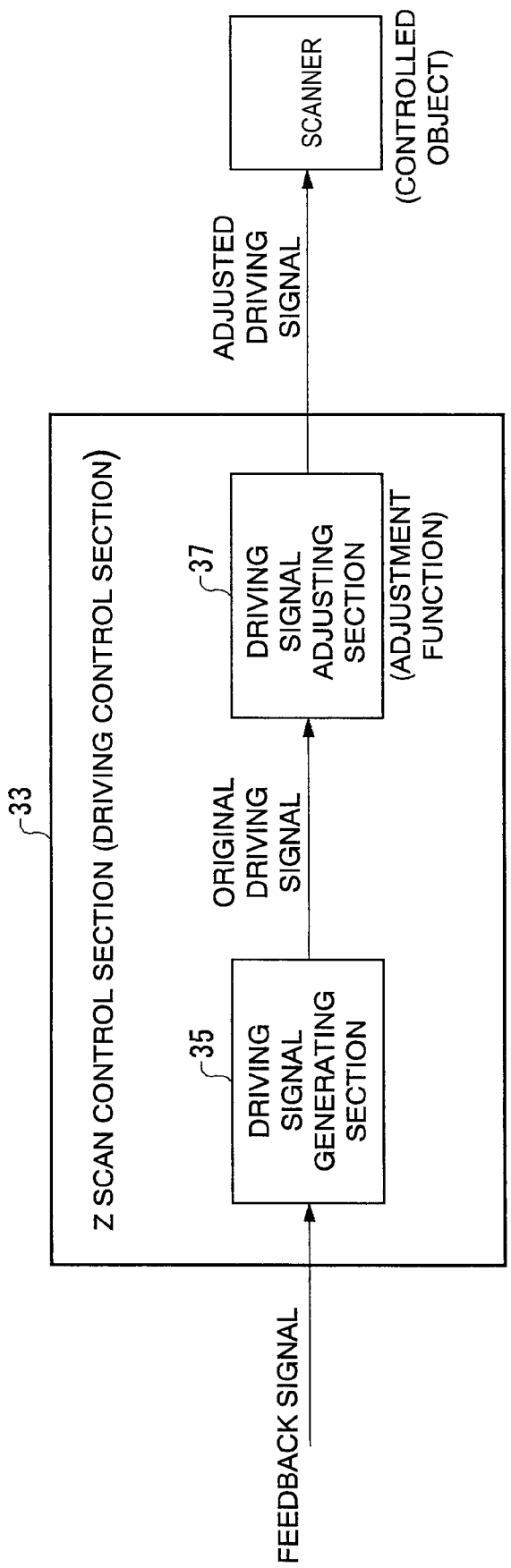

[Fig. 7]
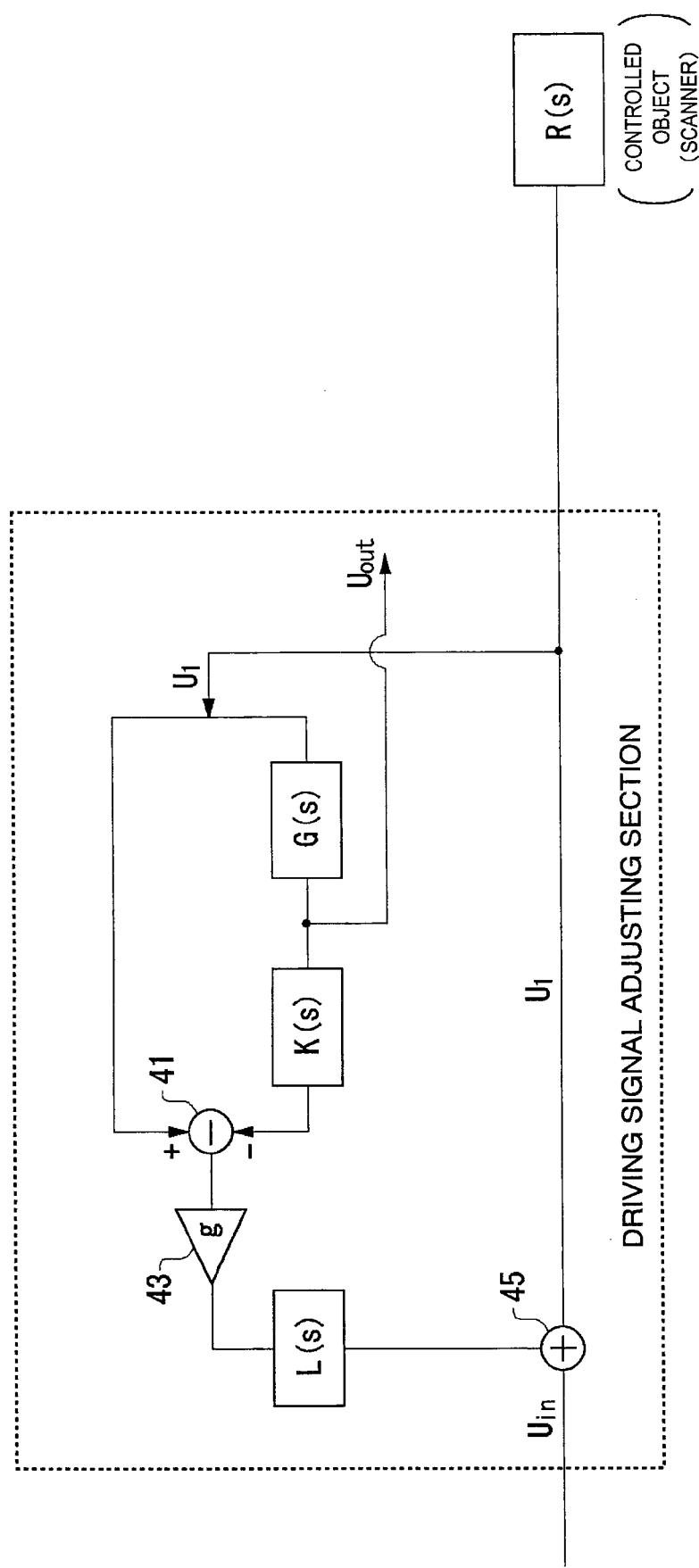

[Fig. 8]
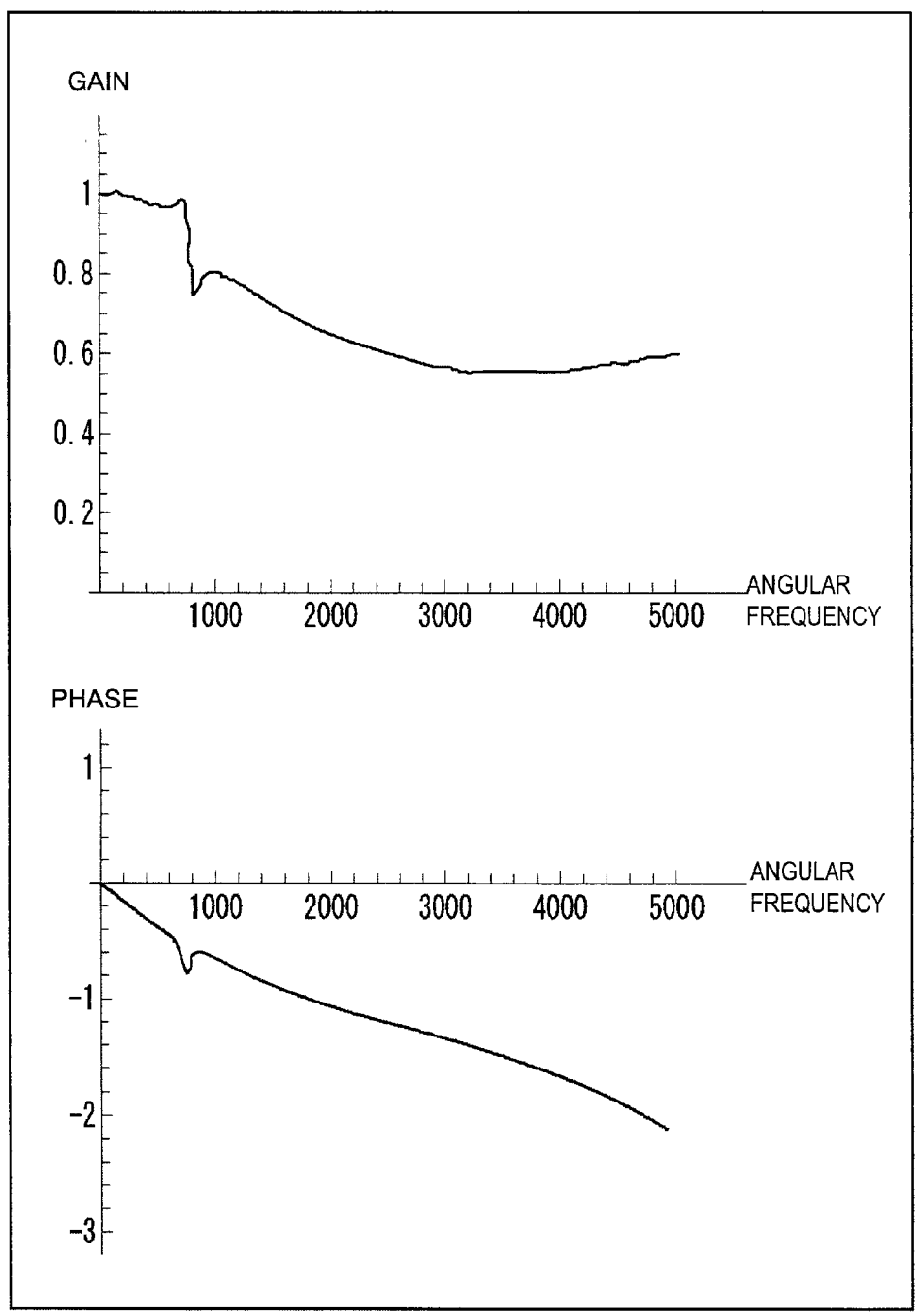

[Fig. 9]
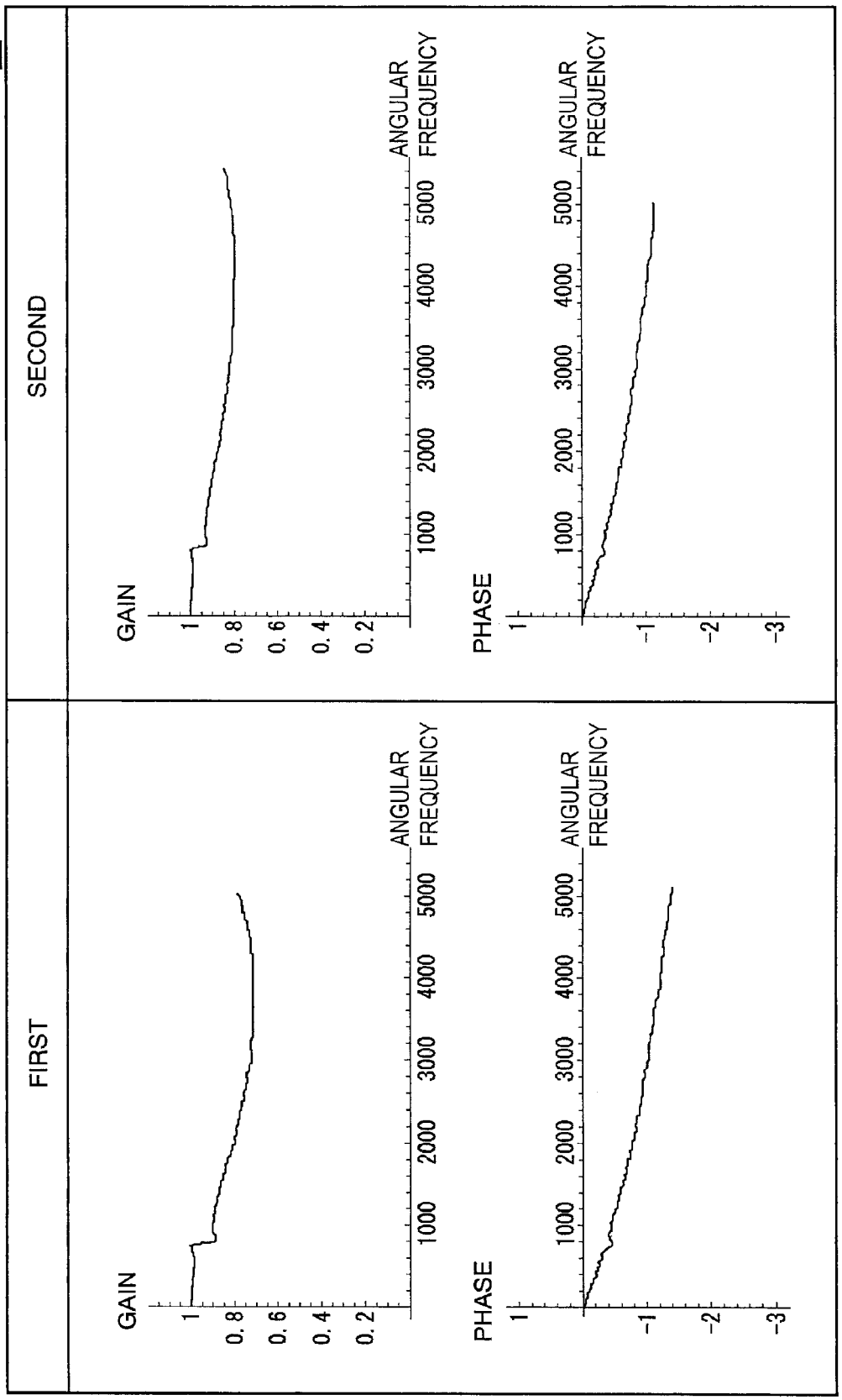

[Fig. 10]
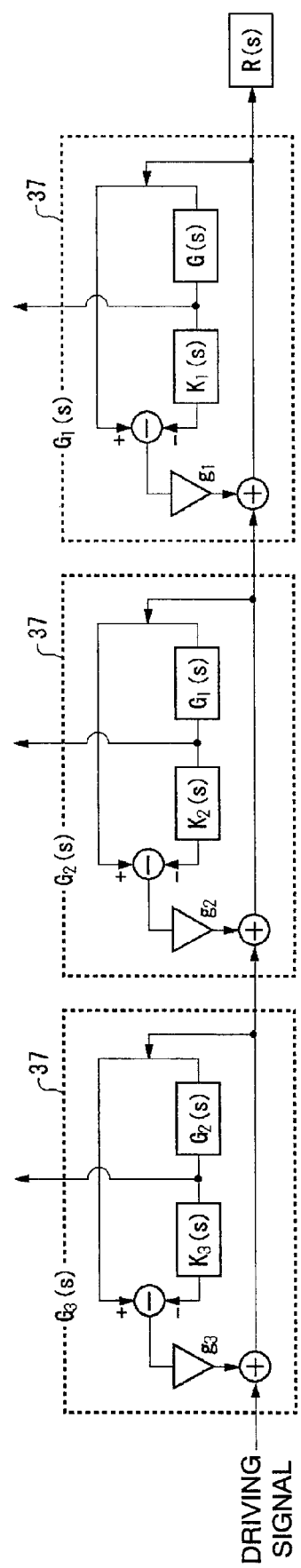

[Fig. 11]
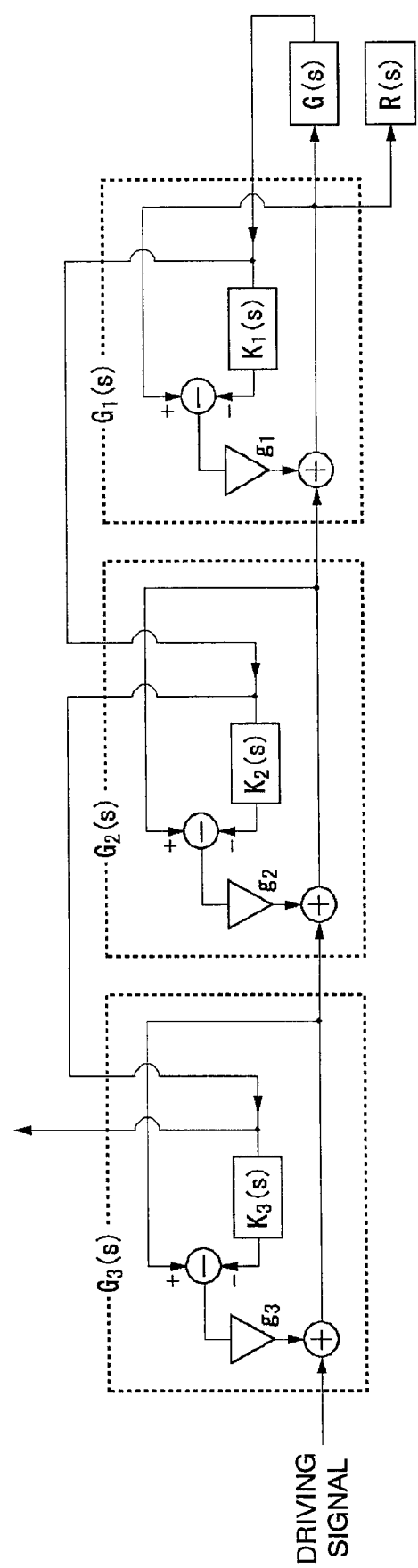

[Fig. 12-A]
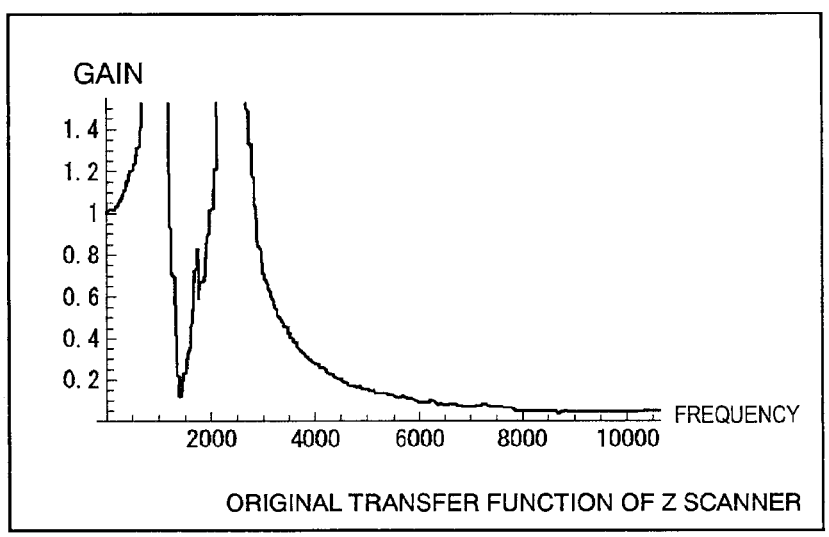
ORIGINAL TRANSFER FUNCTION OF Z SCANNER
[Fig. 12-B]
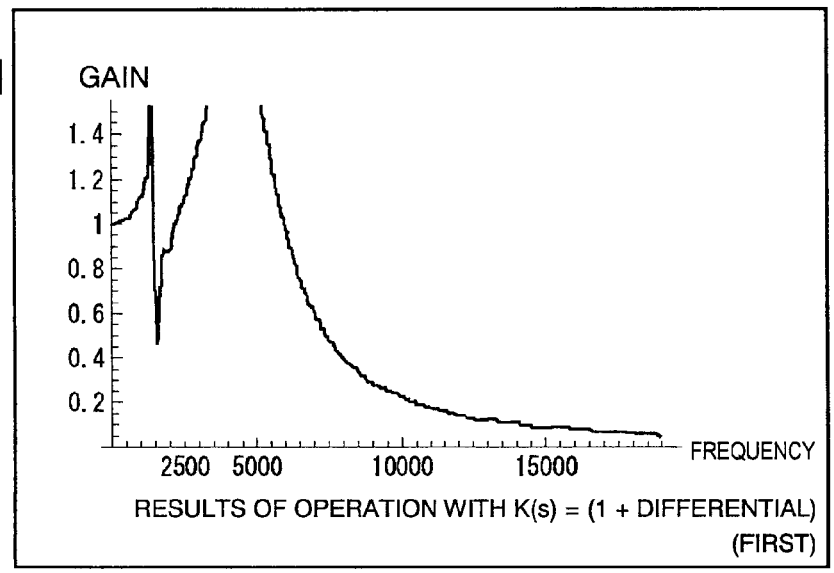
RESULTS OF OPERATION WITH K(s) = (1 + DIFFERENTIAL)
(FIRST)
[Fig. 13-A]
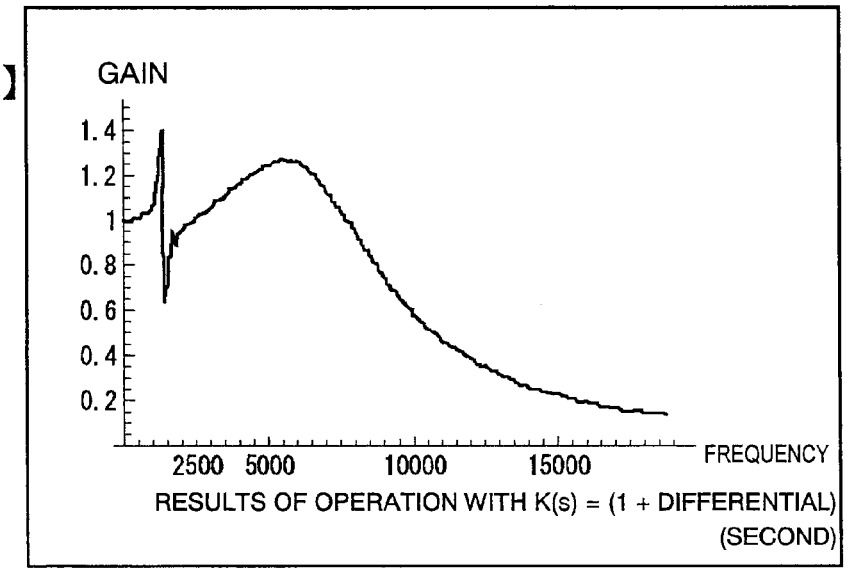
RESULTS OF OPERATION WITH K(s) = (1 + DIFFERENTIAL)
(SECOND)

[Fig. 13-B]
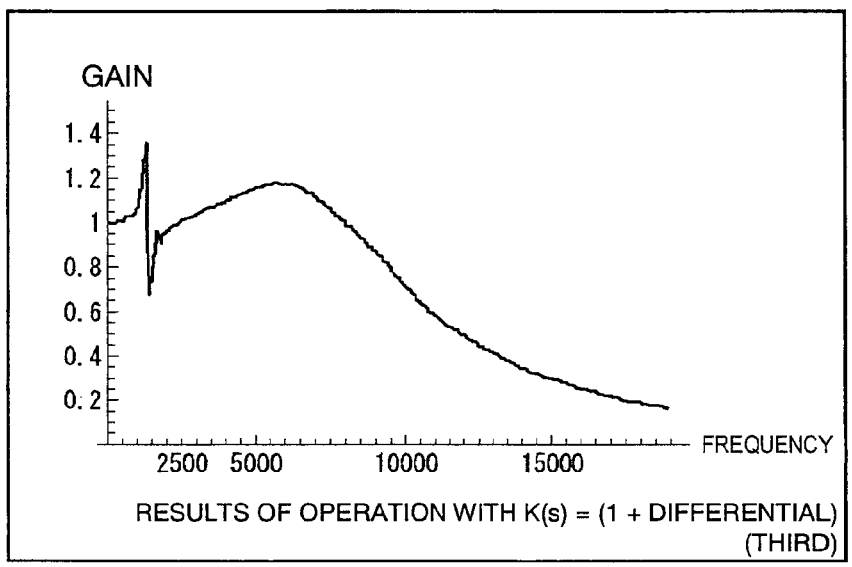
RESULTS OF OPERATION WITH K(s) = (1 + DIFFERENTIAL)
(THIRD)
[Fig. 14-A]
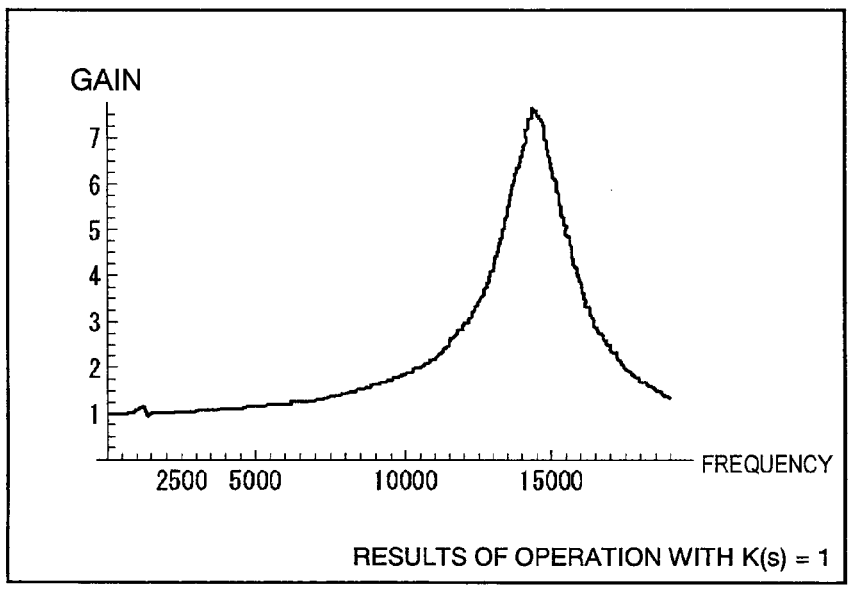
RESULTS OF OPERATION WITH K(s) = 1
[Fig. 14-B]
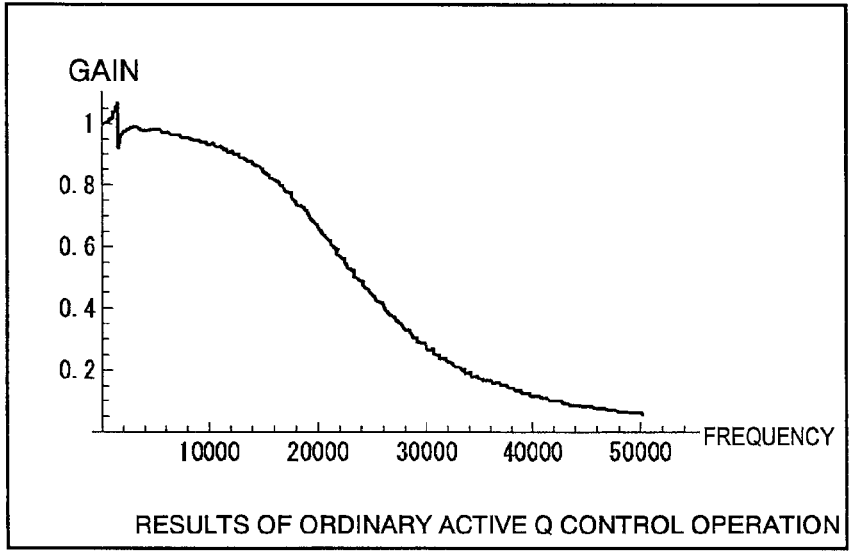
RESULTS OF ORDINARY ACTIVE Q CONTROL OPERATION

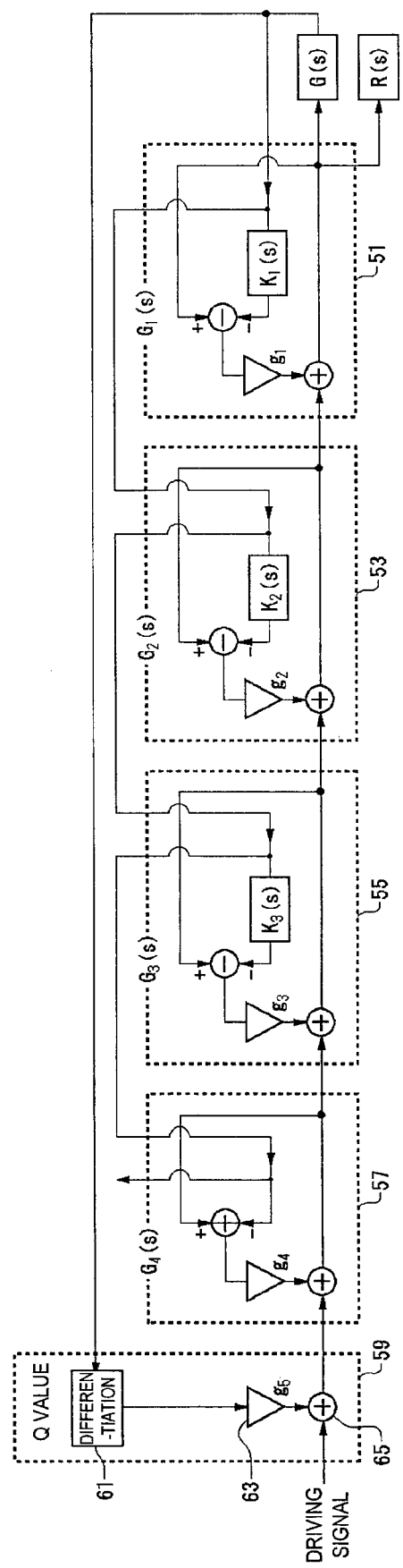
[Fig. 15]

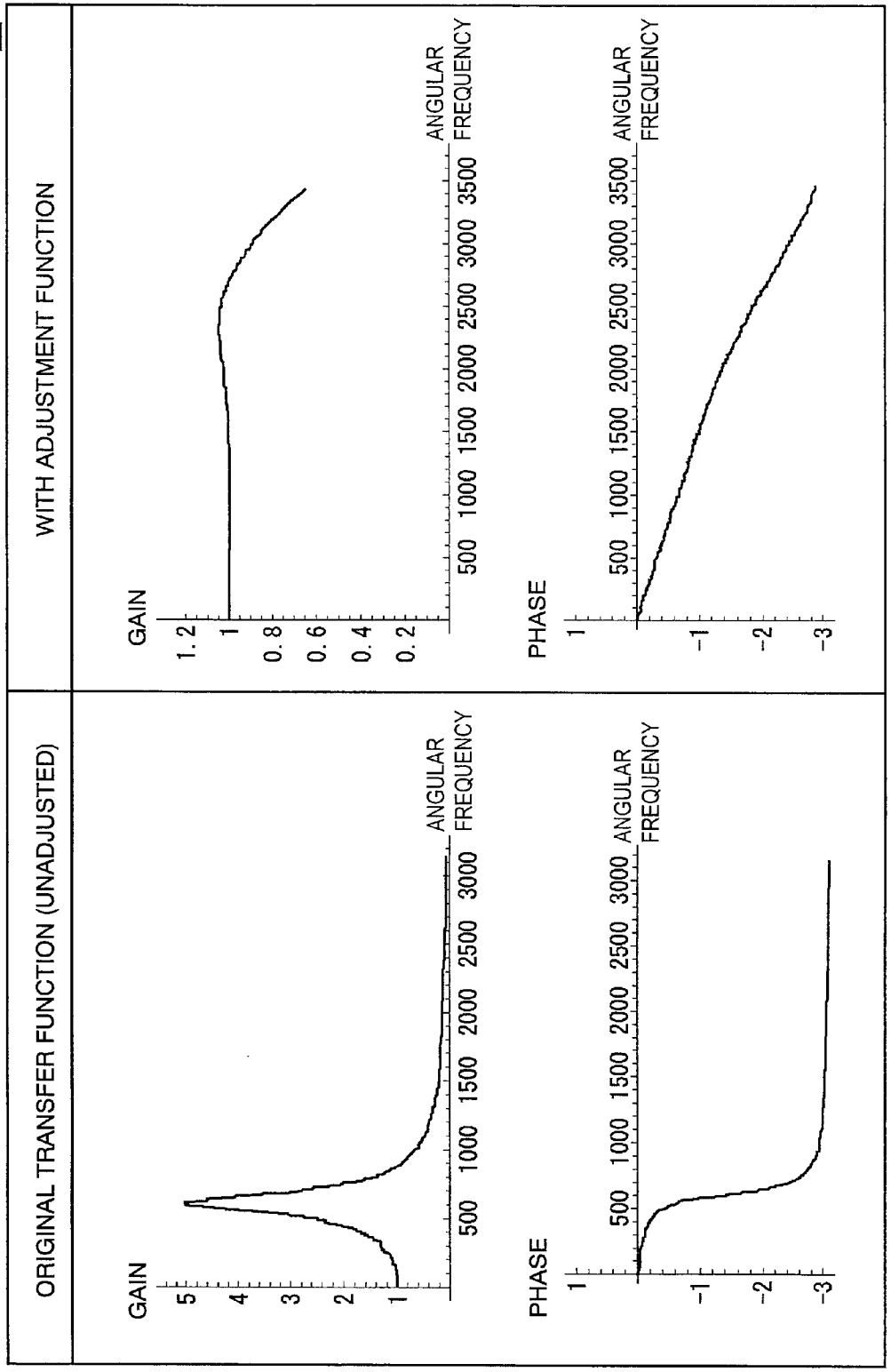

[Fig. 17]
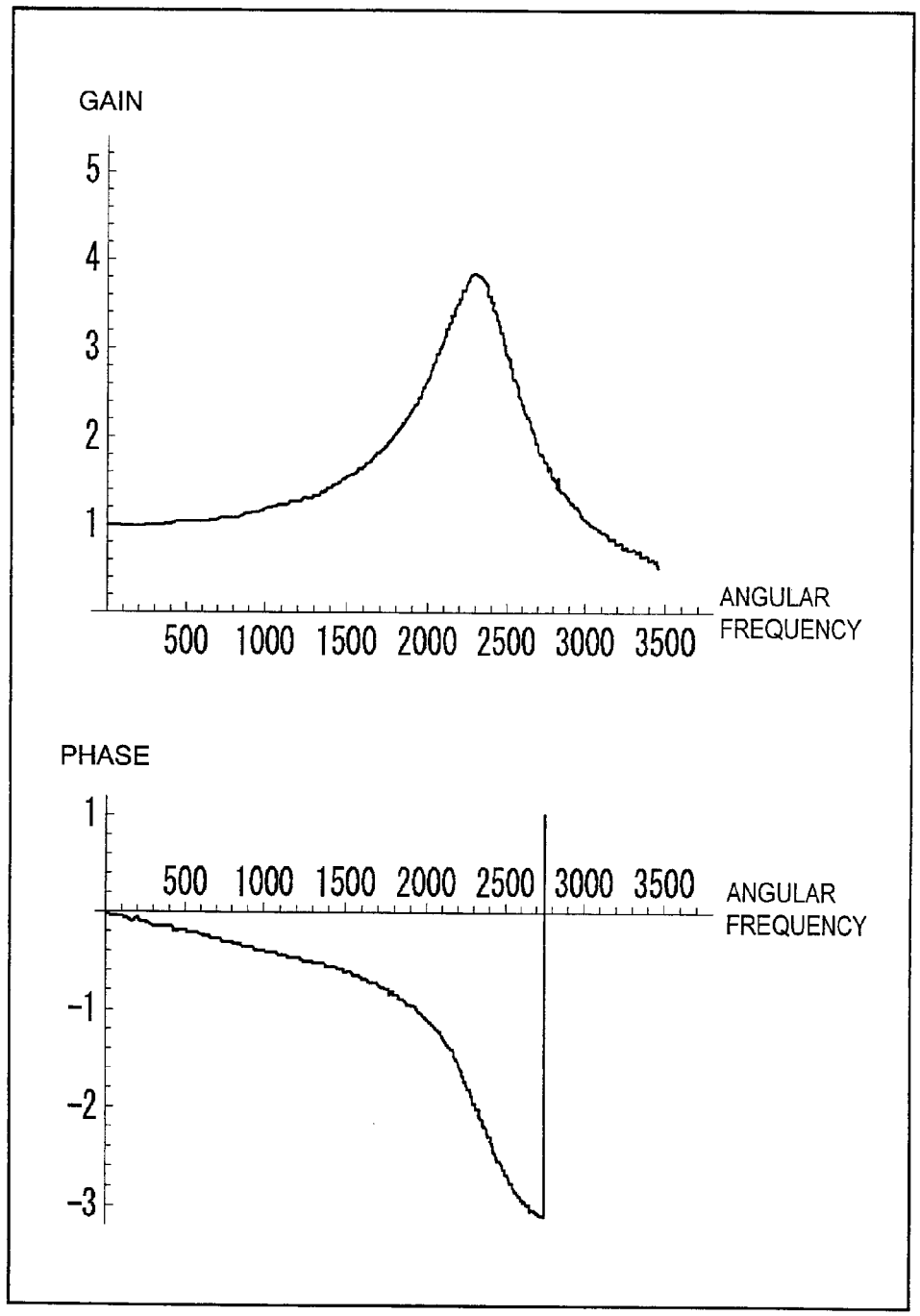

SCANNING PROBE MICROSCOPE AND ACTIVE DAMPING DRIVE CONTROL DEVICE

TECHNICAL FIELD

The present invention relates to a scanning probe microscope that performs relative scan between a probe and a sample to observe the sample, and in particular, relates to a control technique for performing active damping on a controlled object such as a scanner.

BACKGROUND ART

As typical scanning probe microscopes (SPMs), scanning tunnel microscopes (STMs) and atomic force microscopes (AFMs) have been known. Among these microscopes, AFMs are expected as a technique for observing, for example, the nano-functional dynamics of biological molecules.

Conventionally proposed typical AFMs comprise a cantilever having a probe at the free end, and a scanner that performs scanning of a sample stage. These AFMs sense displacement of the cantilever to control the scanner so as to maintain the distance between the probe and the sample.

An important objective of the AFM is to increase scan speed. In particular, observation of functional dynamics of biological molecules as described above needs to be achieved in a short time. This requires the scan speed to be increased.

In increasing the scan speed of the AFM, the scanner for the sample stage is the device whose performance is most difficult to be improved. A conventional scanner is composed of piezoelectric transducing element, called piezoactuator. While the cantilever has a microscopic size, the scanner has a macroscopic size. Because of the size of the scanner, it is difficult to increase the resonant frequency of the scanner. Accordingly, to avoid undesired vibration, scanning must be executed at lower frequencies than the resonant frequency of the scanner. Thus, the scanner has been a bottleneck for increasing in the speed of the AFM.

An active damping is widely used which is a control technique carrying out damping in accordance with the condition of a controlled object (displacement, speed, acceleration, or the like). The active damping is capable of eliminating or reducing the resonance of the controlled object.

An active Q-control method is known as an active damping method. The active Q-control method carries out damping by differentiating a vibration signal detected in the controlled object (control target), inverting the plus and minus sign of the differentiated signal, and adding the resultant signal to a driving signal, thereby increasing an apparent viscous resistance. However, this ordinary active damping method is not sufficiently effective on a resonant system such as a scanner having plural resonant components connected in parallel, accordingly considerably large resonant components may remain.

The conventional active damping method will be described in further detail. Here, first, the principle of an active-control method will be described. The simplest resonant system has a transfer function G(s) expressed by a second-order low pass filter, that is, indicated in equation (1).

$$G(s) = \frac{\omega_0^2}{s^2 + \frac{\omega_0}{Q}s + \omega_0^2} \quad (1)$$

In this system, the Q value can be reduced by performing an operation shown in the block diagram in FIG. 1. The Q value (Quality Factor) refers to an amount indicating the sharpness of a resonant spectrum. The Q value increases consistently with decreasing viscous resistance of the resonant system. In contrast, the Q value decreases consistently with increasing viscous resistance. The configuration shown in FIG. 1 differentiates an output signal Uout from a system described by a transfer function G(s), inverts the plus and minus sign of the differentiated signal (−D(s)), applies a gain to the plus-minus-inverted signal, and adds the resultant signal to an input signal (driving signal) Uin.

In FIG. 1, a differentiating operation D(s) is $s/\omega_0$. A transfer function indicating the input-output (I/O) relationship in FIG. 1 is as shown below.

$$G'(s) = \frac{G(s)}{1 + gD(s)G(s)} = \frac{\omega_0^2}{s^2 + \omega_0 \frac{1+gQ}{Q}s + \omega_0^2} \quad (2)$$

As shown in this equation, the Q-control reduces the Q value to Q/(1+gQ) to suppress possible resonance. For example, setting a gain 'g' at (2−1/Q) completely eliminates possible resonance.

An example in the case of a simple transfer function G(s) has been described. However, in the actual AFM, the scanner is a resonant system having plural resonant components connected in parallel. Accordingly, possible resonance cannot be easily suppressed as described above. For example, a transfer function for a resonant system having two parallel resonant components is expressed as follows.

$$G(s) = \frac{A_1\omega_1^2}{s^2 + \frac{\omega_1}{Q_1}s + \omega_1^2} + \frac{A_2\omega_2^2}{s^2 + \frac{\omega_2}{Q_2}s + \omega_2^2} \quad (3)$$

In this equation, A1 and A2 denote the rates of magnitude of the respective components. Supposing that these components can be separately subjected to Q-control as shown in FIG. 2, the resonance of each component can be completely restrained (FIG. 2 shows a block diagram in which two resonant components can be individually subjected to Q-control). However, actual resonant systems have a single input and a single output. Consequently, it is impossible to perform individual Q-control. In other words, it is impossible to divide an input into two or to add outputs together as is the case with the configuration in FIG. 2.

Thus, actually, Q-control as shown in FIG. 3 must be performed. In FIG. 3, Q-control is performed on the sum of resonant components. Thus, the Q-control is incomplete as described in the following example.

FIG. 4 shows a transfer function of a resonant system having two resonant components (shown in the left side) and a transfer function obtained by performing Q-control using the configuration in FIG. 3 (shown in the right side). The upper side graph shows the relationship between angular frequency and gain. The lower side graph shows the relationship between angular frequency and phase. In this example, the original resonant system has resonant components, $\omega_1 = 2\pi \times 100$ kHz and $\omega_2 = 2\pi \times 200$ kHz (the left side in the FIG. 4).

As shown in FIG. 4, the Q-control has reduced the peak of the gain and thus resonances. However, the resonances have not been completely eliminated yet. Further, the valley of the phase has not been eliminated and remains as it is. With respect to an input signal having an almost central frequency between the two resonant frequencies, the phase is particularly delayed significantly.

The Q-control for the AFM is disclosed, for example, in Japanese Patent Laid-Open No. 2005-190228. The AFM in this document performs Q-control by detecting displacement of the scanner, and executing feedback processing on the basis of a detection signal (FIG. 17 of the document).

Japanese Patent Laid-Open No. 2005-190228 also proposes a Q-control technique using an equivalent circuit for the scanner (FIG. 19 of the document). The equivalent circuit has a transfer function equivalent to that of the scanner. An output from the equivalent circuit is processed as displacement of the scanner and Q-control is performed. A second-order low pass filter is illustrated as the equivalent circuit.

The conventional active damping technique has been explained above. As described in the above example, with the active damping such as the conventional active Q-control, it is not easy to sufficiently suppress vibrations of scanner of the AFM. For increasing the speed of the AFM, it is desirable to provide a more effective vibration reducing technique.

Further, the active damping is basically a technique for reducing the resonant peak. For increasing the speed of the AFM, if an available frequency band is increased or expanded by, for example, increasing a resonant point, such expanded band is more advantageous. However, such control has been generally impossible.

The background of the present invention has been described above taking the case of the scanner of the AFM. However, similar problems also occur with driving controlled objects other than the scanner of the AFM. For example, a vibration control technique is important for components other than the scanner of the AFM. Further, the vibration control technique is important for the SPMs other than the AFMs. Moreover, the similar requirement is seen in not only the SPMs but also various objects to be driven in a controlled manner.

DISCLOSURE OF THE INVENTION

The present invention has been made under the above background. An object of the present invention is to provide a scanning probe microscope (SPM) which can advantageously reduce vibrations of a controlled object (control target) to be driven.

An object of the present invention is to provide an active damping driving control technique that effectively carries out active damping on a controlled object.

MEANS FOR SOLVING THE PROBLEMS

The present invention provides a scanning probe microscope that performs relative scan between a probe and a sample to observe the sample, comprising: a controlled object that is a physical structure for driving at least one of the sample and the probe; and a driving control section for supplying a driving signal to the controlled object to control the controlled object. The driving control section is configured to supply the controlled object with the driving signal processed by an adjustment function that converts the driving signal. The adjustment function adjust the driving signal by using a simulated transfer function that simulates an actual transfer function indicative of an actual frequency characteristic of the controlled object, so that when the processing of the simulated transfer function is executed on the adjusted driving signal, vibrations of an output signal from the simulated transfer function decrease.

This configuration allows the controlled object to be supplied with the driving signal processed by the adjustment function as described above. The driving signal is adjusted so that the simulated transfer function provides outputs with reduced vibrations. This provides an effective reduction in vibrations of the actual controlled object.

Further, the driving control section may subject the driving signal to processing of the adjustment function so that an output obtained by executing the processing of the simulated transfer function on the adjusted driving signal approximates to an output obtained by executing a target transfer function different from the simulated transfer function on the unadjusted driving signal.

Furthermore, the driving control section may have a driving signal adjusting section for executing the processing of the adjustment function on the driving signal. The driving signal adjusting section may have: a simulated transfer function processing section for executing the processing of the simulated transfer function on the driving signal; an inverse target transfer function processing section for executing the processing of an inverse target transfer function on an output from the simulated transfer function processing section, the inverse target transfer function corresponding to an inverse of the target transfer function; a subtraction processing section for calculating a difference between the driving signal and an output from the inverse target transfer function processing section; a gain applying section for applying a gain to an output from the subtraction processing section; and an addition processing section for adding an output from the gain applying section to the driving signal.

Another aspect of the present invention is an active damping driving control apparatus which supplies a driving signal to a controlled object and which performs active damping control on the controlled object. The active damping driving control apparatus is configured to supply the controlled object with the driving signal processed by an adjustment function that converts the driving signal. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

Another aspect of the present invention is a transfer function converting device provided in a driving control apparatus that supplies a driving signal to a controlled object so as to control driving of the controlled object, the device converting a driving operation in accordance with an actual transfer function indicative of an actual frequency characteristic of the controlled object when the driving signal is supplied to the controlled object, into an operation in accordance with a target driving function different from the actual transfer function. The device comprises: a simulated transfer function processing section that subjects the driving signal to the processing of a simulated transfer function simulating the actual transfer function; an inverse target transfer function processing section that subjects an output from the simulated transfer function processing section to the processing of an inverse target transfer function corresponding to an inverse of the target transfer function; a subtraction processing section for calculating a difference between the driving signal and an output from the inverse target transfer function processing section; a gain applying section for applying a gain to an output from the subtraction processing section; and an addition processing section for adding an output from the gain applying section to the driving signal.

Another aspect of the present invention is a driving control method for a scanning probe microscope that performs relative scan between a probe and a sample to observe the sample, the method supplying a driving signal to a controlled object that is a physical structure for driving at least one of the sample and the probe, to control the controlled object. The method comprises supplying the controlled object with the driving signal processed by an adjustment function that converts the driving signal. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

Another aspect of the present invention is an active damping driving control method that supplies a driving signal to a controlled object to perform active damping control on the controlled object. The method comprises supplying the controlled object with the driving signal processed by an adjustment function that converts the driving signal. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

Another aspect of the present invention is a transfer function converting method for a driving control device that supplies a driving signal to a controlled object so as to control driving of the controlled object, the method converting a driving operation in accordance with an actual transfer function indicative of an actual frequency characteristic of the controlled object when the driving signal is supplied to the controlled object, into an operation in accordance with a target driving function different from the actual transfer function. The method comprises: executing the processing of a simulated transfer function simulating the actual transfer function on the driving signal; executing the processing of an inverse target transfer function on an output from the simulated transfer function, the inverse target transfer function corresponding to an inverse of the target transfer function; calculating a difference between the driving signal and an output from the inverse target transfer function; applying a gain to an output from the difference processing; and adding a resultant signal after the gain is applied to the driving signal.

The present invention can provide a scanning probe microscope (SPM) that supplies the controlled object with the driving signal processed by the adjustment function as described above, thereby advantageously reducing vibration of the controlled object. Further, the present invention can provide an active damping driving control technique that can advantageously perform active damping on the controlled object using the adjustment function as described above.

As described hereafter, other aspects of the invention exist. Thus, this disclosure of the invention is intended to provide a few aspects of the invention and is not intended to limit the scope of the invention described and claimed herein.

BRIEF DESCRIPTION OF THE DRAWINGS

FIG. 1 shows the configuration of conventional active Q value control;

FIG. 2 shows the configuration of active Q value control performed on the assumption that two parallel resonant components can be individually controlled;

FIG. 3 shows the configuration of active Q value control that is actually applicable to a resonant system having two parallel resonant components;

FIG. 4 shows a transfer function for a resonant system having two resonant components (left) and a transfer function obtained when the configuration in FIG. 3 performs Q value control (right);

FIG. 5 shows the configuration of an AFM according to an embodiment of the present invention;

FIG. 6 shows the configuration of a Z scan control section;

FIG. 7 shows the configuration of a driving signal adjusting section;

FIG. 8 shows a transfer function obtained by applying an inverse target transfer function $K(s)$;

FIG. 9 shows the result of performing the active damping operation once (left) and the result of performing the active damping operation twice (right);

FIG. 10 shows a circuit configuration used to perform the active damping control operation a plurality of times;

FIG. 11 shows a circuit configuration used to perform the active damping control operation a plurality of times and provided with a common $G(s)$;

FIG. 12A is the first diagram showing the results of processing with a combination of $K(s)=(1+\text{differential})$, $K(s)=1$, and Q value control;

FIG. 12B is the second diagram following FIG. 12A, showing the results of processing with a combination of $K(s)=(1+\text{differential})$, $K(s)=1$, and Q value control;

FIG. 13A is the third diagram following FIG. 12B, showing the results of processing with a combination of $K(s)=(1+\text{differential})$, $K(s)=1$, and Q value control;

FIG. 13B is the fourth diagram following FIG. 13A, showing the results of processing with a combination of $K(s)=(1+\text{differential})$, $K(s)=1$, and Q value control;

FIG. 14A is the fifth diagram following FIG. 13B, showing the results of processing with a combination of $K(s)=(1+\text{differential})$, $K(s)=1$, and Q value control;

FIG. 14B is the sixth diagram following FIG. 14A, showing the results of processing with a combination of $K(s)=(1+\text{differential})$, $K(s)=1$, and Q value control;

FIG. 15 shows a configuration that combines $K(s)=(1+\text{differential})$, $K(s)=1$, and Q value control together;

FIG. 16 shows the result of processing according to the present invention obtained when a controlled object is a cantilever; and FIG. 17 shows the result of processing according to the present invention obtained when the controlled object is a cantilever.

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

In the present embodiment, the present invention is applied to an atomic force microscope (AFM) that is a kind of scanning probe microscope (SPM).

FIG. 5 shows the configuration of an AFM according to the present embodiment. First, description will be given of the overall configuration and operation of an AFM 1.

As shown in FIG. 5, generally speaking, the AFM 1 comprises a sample stage 3 that holds a sample and a cantilever 5 placed in proximity to the sample. Further, the AFM 1 has a scanner 7 and a scan control circuit 9 as a configuration for performing scanning of the sample stage in an X direction, a Y direction, and a Z direction. Furthermore, the AFM 1 has a holder 11, an exciting piezo element 13, and an oscillator 15 as a configuration for holding and oscillating the cantilever 5 at frequencies close to a resonant frequency. Moreover, the AFM 1 has a laser unit 17 and a sensor 19 in order to sense displacement of the cantilever 5. Further, the AFM 1 has an amplitude detecting circuit 21 and a feedback circuit 23 for feedback scans for maintaining a constant lever amplitude on the basis of a displacement signal of the cantilever 5. Moreover, the AFM 1 has a computer 25 that controls the whole device and a monitor 27 that displays observation images supplied by the computer 25.

The sample stage 3 is configured to hold a sample on its bottom surface. The sample stage 3 is attached to the scanner 7. The scanner 7 has piezo elements (piezoelectric elements) as actuators to move the sample stage 3 in the X, Y, and Z directions to perform a relative scan of the sample relative to the cantilever 5. The X and Y directions are orthogonal to each other on a horizontal plane. The Z direction is a vertical direction or the direction of sample unevenness (i.e. height direction).

Driving of the scanner 7 is controlled by the scan control circuit 9. The scan control circuit 9 corresponds to a driving control section of the scanner 7 and supplies driving signals to the scanner 7. In the scanner 7, a driving circuit for the piezo element operates on a scan signal to drive the scanner 7.

The scan control circuit 9 has an XY scan control section 31 and a Z scan control section 33. The XY scan control section 31 controls driving in the X and Y directions. The Z scan control section 33 drives the scanner 7 in the Z direction. The Z scan control section 33 executes feedback scans on the basis of sensor displacements as described later.

The cantilever 5 is made of silicon nitride and has a probe at a free end. The cantilever 5 is held by the holder 11, which is provided together with an exciting piezo element 13 (exciting piezoelectric element). The exciting piezo element 13 is supplied with an excitation signal by the oscillator 15; the excitation signal serves as a driving signal. The excitation signal typically has a sine wave. In the exciting piezo element 13, the driving circuit operates on the excitation signal to oscillate the holder 11 and cantilever 5 together with the exciting piezo element 13.

The sensor 19 constitutes an optical lever-based displacement sensor together with the laser unit 17. The laser unit 17 irradiates the cantilever 5 with laser light. The laser light is reflected by the cantilever 5 and reaches the sensor 19. The sensor 19 is composed of a photo diode to output signals indicative of the displacement of the cantilever. In the drawing, the configuration of an optical system including lenses is omitted which relates to the sensor.

The amplitude detecting circuit 21 processes a displacement signal input by the sensor 19 to determine the amplitude of the cantilever 5. The detected amplitude value is output to the feedback circuit 23. The computer 25 also inputs an target amplitude value to the feedback circuit 23. The feedback circuit 23 comprises a subtractor that subtracts the target amplitude value from the detected amplitude value to generate a difference signal, and a PID circuit that amplifies the difference signal. These configurations generate a feedback signal.

The feedback signal is supplied to the scan control circuit 9 and used for feedback scans. In the feedback scan, the Z scan control section 33 performs a Z scan so as to maintain the amplitude of the cantilever 5 at a constant value. Further, the feedback signal is supplied to the computer 25 and used to generate a sample image.

The computer 25 controls the whole AFM 1. The computer also provides a user interface function such that a user's various instructions are input to the computer 25, which thus controls the AFM 1 in accordance with the user's inputs. Further, the computer 25 generates and outputs images of surface of a sample to the monitor 27.

Now, the overall operation of the AFM 1 will be described. The computer 25 inputs a control signal for a scan in the X and Y directions to the scan control circuit 9. In accordance with the control signal, the scan control circuit 9 controls driving of the scanner 7, which thus performs the scan in the X and Y directions. In the driving control, a driving signal is supplied to the driving circuit of the scanner 7. Further, the computer 25 supplies the oscillator 15 with an instruction value for an excitation intensity (amplitude). The oscillator 15 generates an excitation signal under the control of the computer 25 to supply the excitation signal to the exciting piezo element 13. In accordance with the excitation signal, the driving circuit drives the exciting piezo element 13 to allow the cantilever 5 to oscillate at a frequency close to the resonant frequency. Thus, the oscillating cantilever 5 and the sample are subjected to the relative scan in the X and Y directions relative to each other.

During the XY scan, displacement of the cantilever 5 is detected by the sensor 19. The amplitude detecting circuit 21 determines the amplitude of the cantilever 5. Then, on the basis of the target amplitude value supplied by the computer 25, the feedback circuit 23 generates a feedback signal corresponding to the difference between the detected amplitude value and the target amplitude value. The feedback signal is supplied to the scan control circuit 9. In accordance with the feedback signal, the Z scan control section 33 of the scan control circuit 9 controls driving of the scanner 7 so that the detected amplitude value is equal to the target amplitude value. This feedback control maintains a constant distance between the cantilever 5 and the sample.

Thus, AFM 1 performs an XY scan while performing a Z scan that maintains the constant distance between the cantilever 5 and the sample. The feedback signal for the Z scan is also supplied to the computer 25 by the feedback circuit 23. The feedback signal corresponds to the height of the sample in the Z direction. Further, a position on the sample in the X and Y directions is determined by an XY scan control signal generated by the computer 25 and supplied to the scan control circuit 9. On the basis of the XY scan control data and the input feedback signal, the computer 25 generates and displays an image of the sample surface on the monitor 27. A three-dimensional image is suitably generated and displayed.

Description has been given of overall configuration and operation of the AFM 1 according to the present embodiment. Now, characteristic configurations of the present invention will be described. Unlike feedback control such as the conventional active Q value control, the technique of the present invention implements active damping by executing processing of an adjustment function on a driving signal for a controlled object as described below. In the example described below, the controlled object is the scanner 7, more specifically, the scanner 7 and the sample stage 3 attached to the scanner 7. The driving control configuration of the present invention is provided in the Z scan control section 33 of the scan control circuit 9 and applied to Z scan control.

FIG. 6 shows the configuration of the Z scan control section 33 according to the present embodiment. As described above, in this example, the Z scan control section 33 is a configuration corresponding to the driving control section of the present invention. The Z scan control section 33 has a driving signal generating section 35 and a driving signal adjusting section 37.

The driving signal generating section 35 is configured to generate a driving signal having a driving waveform corresponding to a driving operation required for the controlled object. In the present embodiment, the driving signal is a Z scan signal. The driving signal generating section 35 is inputted with a feedback signal from the feedback circuit 23, and then generates a Z scan driving signal on the basis of the feedback signal.

The driving signal adjusting section 37 is connected to the driving signal generating section 35, and inputted with a driving signal from the driving signal generating section 35. The driving signal adjusting section 37 is configured to execute processing of the adjustment function on the driving signal. The adjustment function converts the driving signal. Thus, in the present embodiment, the driving signal is processed by the adjustment function before being supplied to the controlled object.

In the driving signal adjusting section 37, the adjustment function utilizes a simulated transfer function as described later in further detail. The simulated transfer function simulates the actual transfer function indicative of the actual frequency characteristic of the controlled object. The adjustment function adjusts the driving signal so that vibration of an output from the simulated transfer function when the driving signal is input is reduced.

More specifically, in the present embodiment, a target transfer function is set which is different from the simulated transfer function. As described below in connection with an example, the adjustment function enables the driving signal to be adjusted so that an output from the simulated transfer function is approximate to an output from a target transfer function.

In FIG. 6, an unadjusted driving signal in the driving signal adjusting section 37 (which has been generated by the driving signal generating section 35) is expressed as an "original driving signal". In contrast, the driving signal after adjustment output by the driving signal adjusting section 37 is expressed as an "adjusted driving signal". These expressions are used to distinguish the unadjusted and adjusted driving signals (driving signals before and after adjustment) from each other.

FIG. 7 is a diagram showing the configuration of the driving signal adjusting section 37 together with a controlled object R(s). The circuit configuration in FIG. 7 (except for R(s)), as a whole, functions to execute the processing of the adjustment function on the driving signal. That is, the entire configuration in FIG. 7 serves as one adjustment function.

In FIG. 7, an input Uin is a driving signal input to the driving signal adjusting section 37. That is, the input Uin is a driving signal generated by the preceding driving signal generating section 35. The input Uin corresponds to the original driving signal in FIG. 6.

Further, an adjusted signal U1 is the driving signal adjusted by the driving signal adjusting section 37. The adjusted signal U1 corresponds to the adjusted driving signal in FIG. 6. The adjusted signal U1 is supplied to the controlled object R(s). The controlled object R(s) is the actual system of the controlled object, in the present embodiment, the system of the scanner (precisely speaking, the scanner and the sample stage).

In FIG. 7, a simulated transfer function processing section G(s) has a circuit configuration that executes processing of the simulated transfer function on the driving signal. This circuit configuration is hereinafter simply referred to as the G(s) or the simulated transfer function G(s). The G(s) is a function that simulates the R(s). When the G(s) is equivalent to the R(s), an output Uout from the G(s) becomes equal to the operation of the actual system.

The simulated transfer function processing section G(s) connects to and is followed by an inverse target transfer function processing section K(s). The inverse target transfer function processing section K(s) is a configuration that executes processing of an inverse target transfer function on the output from the G(s). This circuit configuration is hereinafter referred to as the K(s) or the inverse target transfer function K(s). The inverse target transfer function corresponds to the inverse or reciprocal of the target transfer function. The target transfer function is a function that is a target of control, and different from the simulated transfer function.

The K(s) is connected to a subtractor 41. The subtractor 41 is configured to calculate the difference between the adjusted signal U1 and the K(s) output and corresponds to the subtraction processing section of the present invention. In the present embodiment, the K(s) output is subtracted from the adjusted signal U1.

An subtractor 41 is further connected to the amplifier 43. The amplifier 43 is configured to apply a gain g to the output from the subtractor 41 and corresponds to the gain applying section of the present invention. The output from the amplifier 43 is supplied to an adder 45 and added to the input Uin. Here, a delay transfer function processing section (delay processing section) L(s) is placed between the amplifier 43 and the adder 45. This configuration is hereinafter simply referred to as the L(s) or the delay transfer function L(s). The L(s) corresponds to the frequency band of an amplifier required to provide the diagram shown in FIG. 7. An amplifier is required to assemble the circuit shown in FIG. 7; there exists a delay of the amplifier in an actual circuit system (the amplifier corresponds to a low pass filter), and this delay in the amplifier is represented as L(s).

The output from the amplifier 43 is supplied to the adder 45 via the L(s). The adder 45 adds the signal input from the amplifier 43 via the L(s) to the input Uin and corresponds to the addition processing section of the present invention.

In the above circuit configuration, the adjusted signal U1 is processed by the G(s) and K(s). Then, the subtractor 41 generates or determines the difference between the adjusted signal U1 and the output from K(s). The amplifier 43 applies the gain "g" to the difference. Then, the output from the amplifier 43 is provided via the L(s) to the adder 45, which then adds the output to the input Uin. The input Um is thus adjusted to become the adjusted signal U1.

In FIG. 7, an I/O transfer function M(s) is expressed as follows. M(s) is Uout/Uin.

$$M(s) = \frac{G(s)}{1 + g[G(s)K(s) - 1]L(s)} \qquad (4)$$

Given that g=1 and L(s)=1, the transfer function M(s) is equal to 1/K(s). Although it is impossible to set L(s)=1, a response Uout to the input Uin through the G(s) becomes similar to a response from the inverse transfer function of K(s).

The K(s) is the inverse or reciprocal of the target transfer function. Accordingly, approximating the Uout by a response from the inverse transfer function of the K(s) means that the Uout is approximate to a response from the target transfer function. Since the G(s) is a transfer function that simulates the controlled object R(s), an actual response from the controlled object is also approximate to the response from the target transfer function.

Thus, the configuration of the driving signal adjusting section 37 in FIG. 7 sets the K(s) equal to the inverse of the desired target transfer function, therefore, the outputs from the G(s) and R(s) can thus be made approximate to the response from the target transfer function instead of the original response. Consequently, by simply setting an appropriate target function and implementing the inverse of the target function into the K(s), the response from the controlled object can be made approximate to the response from the desired target transfer function.

Here, as the active damping, an inverse transfer function phase compensating method is known other than the active Q value control. The active Q value control is as descried in the Background Art. On the other hand, the inverse transfer function phase compensating method is a technique for carrying out damping by multiplying the driving signal by the inverse of the transfer function of the controlled object. In a rough classification, the method of the present invention may be a kind of inverse transfer function phase compensating method. However, the above configuration, which is not found in the prior art, can effectively achieve damping.

Now, the vibration reducing effect of the present invention will further be described with an example of the simulated transfer function G(s) and inverse target transfer function K(s).

In the present embodiment, the controlled object is the scanner 7 of the AFM 1, more specifically, a combination of the Z scanner and the sample stage. It is assumed that the simulated transfer function G(s) is a resonant system having two parallel resonant components. The G(s) is as shown above in Equation (3) and in the left side of FIG. 4, described above. When creating the G(s), transfer function of the controlled object is measured and the G(s) can be created in accordance with the measurement result. Alternatively, if the transfer function is theoretically known, such known transfer function may be implemented by a circuit.

In the case where the simulated transfer function has two resonant components as described above, a first-order low pass filter is suitably set as the target transfer function. In the case where the target transfer function is the first-order low pass filter, the inverse target transfer function K(s) (i.e. inverse of the target transfer function) is (1+differential).

FIG. 8 shows the result of control of the present invention. The above K(s) is applied to the G(s) shown in FIG. 4. The G(s) has two resonant components $\omega_1=2\pi\times 100$ kHz and $\omega_2=2\pi\times 200$ kHz. In this example, with respect to a differentiating operation included in the K(s), the frequency of gain="1" (the frequency corresponding to the differentiation gain=1) is set at 200 kHz. Further, g=0.92 and the band of the L(s) is 8 MHz. Under these conditions, a closed loop does not generate an unstable oscillation as shown in the drawing.

FIG. 8 shows the control of the present embodiment causes the following three characteristic improvements.

(a) Almost all the gain peaks are eliminated from a frequency area in which peaks were originally present.

(b) The valley of the phase is almost completely eliminated.

(c) An angular frequency corresponding to a delay of 90° in phase increases up to about 3500 rad/s (in terms of frequency, increases up to 557 kHz). Here, the delay of 90° in phase corresponds to a resonant point. Consequently, the present embodiment achieves a higher resonant point and a wider available band.

The characteristic (a) is the original effect of the active damping. In contrast, the characteristic (b) and (c) cannot be obtained using the ordinary active damping method. In particular, extending the band to high frequencies as seen in the characteristic (c) is a marked effect. Therefore, it is possible to not only eliminate resonances but also drive the controlled object as the resonant system at higher frequencies. Thus, the configuration of the present invention can provide not only the ordinary active damping effect but also the new effect of increasing the available band.

Such extending the frequency band has a very important meaning. This importance will be described taking an example. In the present embodiment, the present invention is applied to the scanner 7 of the AFM 1. The scanner 7 is composed of a piezoelectric element (piezo element). The piezoelectric element, which is displaced when subjected to a voltage, is used in various fields because the displacement can be controlled to the accuracy of nanometers. The resonant frequency of the piezoelectric element is almost uniquely determined by its length. Resonances are disturbances except when they are utilized. Therefore, the piezoelectric element can be driven only at frequencies equal to or lower than the resonant frequency. An attempt to drive the piezoelectric element at a high speed results in resonances, which disable the control. However, the active control method of the present invention enables the piezoelectric element to be driven at frequencies equal to or higher than the original resonant frequency without causing any resonances and without the need to change the dynamical system of the piezoelectric element. That is, the limits on the dynamical system and mechanical system can be overcome.

The advantages of the present invention have been described in conjunction with the controlled object having the second-order resonant component. However, even for a first-order controlled object without such second order resonant component, the present invention can similarly increase the available frequency band, enabling better control.

Description has been given of effects of the active damping control according to the present embodiment. Now, description will be given of various applied examples of the present embodiment.

"Configuration with a Plurality of Active Damping Operations"

The above embodiment executes the new active damping method of the present invention only once on the resonant system. In this applied example, the active damping method of the present invention is executed a plurality of times on the resonant system.

FIG. 9 shows the result of one time active damping operation (the left side) and the result of two times active damping operations (the right side). For the first operation, the frequency corresponding to the differentiation gain of "1" is set at 600 kHz, g=0.6, and L(s)=8 MHz. For the second operation, the frequency corresponding to the differentiation gain of "1" is set at 900 kHz, g=0.4, and L(s)=8 MHz.

In the example in FIG. 9, the first operation increased the angular frequency corresponding to a delay of 900 in phase up to about 5000 rad/s (in terms of frequency, increased up to 796 kHz). The second operation further increased the angular frequency. Thus, a plurality of operations can increase the frequency area in which the controlled object can be used without causing any resonances.

FIG. 10 shows a configuration for performing the active damping control operation a plurality of times. As shown in FIG. 10, a plurality of driving signal adjusting sections 37 are sequentially arranged in order to perform the active damping control operation a plurality of times. In the example shown in FIG. 10, three driving signal adjusting section 37 are provided to perform the active damping control according to the present invention three times. Each of the driving signal adjusting sections 37 has the configuration shown in FIG. 7. However, the K(s) and "g" are differently set. Further, the L(s) has been omitted from the drawing.

FIG. 11 shows a further varied example of the configuration in FIG. 10. In this configuration, the plurality of driving signal adjusting sections 37 have one common G(s). The G(s) is inputted with a driving signal having passed through the final driving signal adjusting section 37. An output from the common G(s) is supplied to the K(s) provided in each of the plurality of driving signal adjusting sections 37. The configuration in FIG. 11 also produces effects similar to that of the configuration in FIG. 10. Furthermore, the common G(s) allows the circuit configuration to be simplified. An operation for assembling the G(s) actually requires much time and effort. Accordingly, the configuration in FIG. 11 is advantageous.

"Removal of K(s) (for K(s)=1)"

Suppose that in the configuration in FIG. 7, the K(s) has been removed. This corresponds to the case of K(s)=1. The output from the G(s) is directly supplied to the subtractor. In this case, the Uout is similar to the transfer function H(s)=1. Consequently, the adjusted signal U1 is similar to the inverse transfer function of the G(s). In other words, in this case, the configuration in FIG. 7 provides an approximate inverse transfer function of an arbitrary transfer function G(s). This can carry out active damping using the approximate inverse transfer function of the transfer function G(s); this active damping corresponds to what is called an inverse transfer phase compensating method. The inverse transfer phase compensating method is used in various fields. With the conventional inverse transfer phase compensating method, it is difficult to implement a circuit of an inverse transfer function of a complicated transfer function. In contrast, the present invention enables a circuit for a function approximate to the inverse transfer function to be relatively easily implemented.

The configuration for the K(s)=1 also adjusts the driving signal. In this regard, this configuration is included within the scope of the present invention.

In this example, control with K(s)=1 may also be performed a plurality of times. The G(s) is connected to the output of one circuit (circuit with K(s)=1 in FIG. 7) to form a new simulation system and creating an inverse transfer function for this system is repeated one or more times. The repetition allows the system to be made closer to the ideal one. This circuit may be configured in accordance with the circuit shown in FIGS. 10 and 11 (however, the K(s) is removed).

"Combination with K(s)=1" and "Combination with Q-Control" [Combination of K(s)=(1+Differential), K(s)=1, and Q-Control]

In this applied example, higher effects are achieved by combining the active damping with K(s)=(1+differential), active damping with K(s)=1, and the conventional active Q-control together.

Here, the system to be controlled is configured so that three resonant systems as shown below are arranged in parallel. This system corresponds to the actual Z scanner.

$$P_1(s) = \frac{\omega_1^2 \times a}{s^2 + \frac{\omega_1}{Q_1}s + \omega_1^2}$$

-continued $$P_2(s) = \frac{\omega_2^2 \times b}{s^2 + \frac{\omega_2}{Q_2}s + \omega_2^2}$$

$$P_3(s) = \frac{\omega_3^2 \times c}{s^2 + \frac{\omega_3}{Q_3}s + \omega_3^2}$$

$$G_0(s) = P_1(s) + P_2(s) + P_3(s)$$

$\omega_1=2\pi\times174$ kHz, $\omega_2=2\pi\times288$ kHz, $\omega_3=2\pi\times380$ kHz, $Q_1=18.22$, $Q_2=20$, $Q_3=20$, $a=0.58$, $b=0.02$, and $c=0.4$ FIGS. 12A to 14B show the results of performing on the above system, operations with K(s)=(1+differential) three times, then the operation with K(s)=once, and the ordinary active Q-control at last.

FIG. 12A shows the original transfer function of the Z scanner, which has three resonant components as described above. FIG. 12B shows the results of the first operation with K(s)=(1+differential). FIG. 13A shows the results of the second operation with K(s)=(1+differential). FIG. 13B shows the results of the third operation with K(s)=(1+differential). The drawings show that the three times operations considerably reduce the resonant peak.

FIG. 14A shows the results of a further operation with K(s)=1. FIG. 14A shows only one peak. The position of the resonant peak is located at a much higher frequency than the original one.

If there is a single resonant peak as in the case of FIG. 14A, the active Q-control can be suitably applied. Thus, the active Q-control is performed in FIG. 14B. The active Q-control has suitably removed the resonant peak.

In FIG. 14B, the ranges of axes of abscissa and ordinate are increased. In the same frequency range as that in the other drawings, the gain is close to "1". That is, the inverse transfer function of transfer function of the controlled object has been substantially realized to suitably eliminate the adverse effect of the resonant system.

The active damping control method of the present invention can thus be used to smooth outputs from a system expressed by a complicated transfer function having a plurality of peaks. This also can significantly increase the frequency band which has been limited due to the physical system. The object to be controlled is not needed to be physically processed or worked. Instead, the present invention processes signals driving the physical system. This processing increases the frequency band, but if the driving power source does not have a sufficient frequency band, the increase in frequency band levels off soon.

FIG. 15 shows a circuit configuration corresponding to processing shown in FIGS. 12A to 14B. In FIG. 15, driving signal adjusting sections 51, 53, and 55 correspond to the three driving signal adjusting sections 37 in FIG. 11. As in the case of FIG. 11, the common G(s) is used.

In FIG. 15, an additional driving-signal adjusting section 57 precedes the first driving signal adjusting section 55. The additional driving-signal adjusting section 57 does not have the K(s) and inputs an output from the G(s) directly to the subtractor. The additional driving-signal adjusting section 57 has a circuit configuration that performs an operation with K(s)=1. In other words, the additional driving-signal adjusting section 57 is a driving signal adjusting section with K(s)=1. The additional driving-signal adjusting section 57 also uses the common G(s), and an output from the common G(s) is input to the subtractor.

Moreover, FIG. 15 shows an active Q-control section 59. The active Q-control section 59 has a differentiating circuit 61, an amplifier 63, and an adder 65. The differentiating circuit 61 is supplied with an output from the G(s). The differentiating circuit 61 may be inputted with a displacement signal of the actual controlled object R(s). The amplifier 63 amplifies an output signal from the differentiating circuit 61 to apply a gain g5. The resultant signal is then input to the adder 65. In the adder 65, the signal from the amplifier 63 is added to the driving signal, allowing Q-control to be performed.

"Expansion of the Application"

The active damping technique of the present invention can be used not only for the Z scan of the AFM as described above but also for other applications. This technique is applicable to, for example, the X scan and the Y scan. The active damping technique of the present invention can be further widely used; it can be used not only for the piezoelectric element (piezo element) but also for various dynamical and mechanical systems. This technique is expected to be used for various applications. The active damping technique of the present invention is applicable not only to the AFM or SPM but also to other drive controlled objects.

Further, the present invention can be used for various purposes other than active damping by utilizing its characteristic that it can increase the available frequency band used. Although the present invention is applied to the scanner of the AFM in the above example, the present invention is also applicable to the cantilever of the AFM. When applied to the cantilever, the present invention has the following advantages.

A higher resonant frequency of the cantilever can increase the scan speed. However, this generally increases the spring constant. To increase the resonant frequency with a small spring constant maintained, the cantilever needs to be smaller and thinner, which makes the work process difficult. In contrast, the method of the present invention enables the same cantilever to be driven (or excited) at a frequency several times as high as the original resonant frequency.

The example in FIG. 16 shows the transfer function of the cantilever (the left side) and the results of processing of the present invention (the right side). In this example, the original transfer function of the cantilever has a resonant angular frequency of 600 krad/s. In the operation according to the present invention, the frequency corresponding to the differentiation gain of "1" is 230 kHz, g=0.92, and L(s)=8 MHz. As a result, as shown in the drawing, the resonant peak disappears and the cantilever can be driven at a higher frequency than the resonant frequency.

Alternatively, the resonant peak may remain. In this case, the frequency corresponding to the differentiation gain of "1" may be increased. This leads to the results shown in FIG. 17. In FIG. 17, the resonant angular frequency is 600 krad/s. In the operation according to the present invention, the frequency corresponding to the differentiation gain of "1" is set at 450 kHz, g=0.92, and L(s)=8 MHz.

The cantilever originally has a single resonant peak, and for simple damping, the conventional active Q-control is suitably applied. However, the active Q-control does not significantly change the available frequency band. In contrast, the application of the present invention enables the available frequency band to be increased.

The scanning probe microscope of the present invention has been described. As described above, according to the present invention, the scanning probe microscope (SPM) comprises the controlled object that is a physical structure for driving at least one of the sample and the probe, and the driving control section that supplies the driving signal to the controlled object to control it. In the above example, the driving control section is the Z operation control circuit. The driving control section is configured to supply the controlled object with the driving signal processed by the adjustment function that converts the driving signal. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

According to this configuration, the controlled object is supplied with the driving signal processed by the adjustment function as described above. The driving signal is adjusted so as to reduce vibration of the output from the simulated transfer function. This enables a reduction in the vibration of the actual controlled object. There are a plurality of types of SPMs and a plurality of types of AFMs, that is, another type of AFMs are proposed which have different configurations from the AFM illustrated above. The present invention may be applicable to any types of SPMs or AFMs.

Further, in the present invention, the driving control section may subject the driving signal to processing of the adjustment function so that an output obtained by executing the processing of the simulated transfer function on the adjusted driving signal approximates to an output obtained by executing a target transfer function different from the simulated transfer function on the unadjusted driving signal.

According to this configuration, the response of the controlled object to the driving signal can be made approximate to the response from the target transfer function. Appropriately setting the target transfer function provides a good effect on a vibration reducing.

The driving control section may have a driving signal adjusting section for executing the processing of the adjustment function on the driving signal. As described above, the driving signal adjusting section may have: a simulated transfer function processing section for executing the processing of the simulated transfer function on the driving signal; an inverse target transfer function processing section for executing an inverse target transfer function on an output from the simulated transfer function processing section, the inverse target transfer function corresponding to an inverse of the target transfer function; a subtraction processing section for calculating a difference between the driving signal and an output from the inverse target transfer function processing section; a gain applying section for applying a gain to an output from the subtraction processing section; and an addition processing section for adding an output from the gain applying section to the driving signal.

According to this configuration, the response of controlled object to the driving signal can be made approximate to the response from the target transfer function. Therefore, a good effect on a vibration reducing can be obtained.

Further, as described above, the present invention can produce not only the active damping effect of reducing the resonant peak but also the effect of increasing the available frequency band. The present invention may be implemented so as to obtain only the active damping effect or only the effect of increasing the frequency band. The present invention may be also implemented so as to exert both effects. Any of these aspects falls within the scope of the present invention. For example, the present invention is applicable to a controlled object of a first-order system without any resonant peak, and this application may be conducted in order to increase the available frequency band.

Further, the driving control section may include a driving signal generating section for generating the driving signal having a driving waveform corresponding to a driving operation required for the controlled object. The driving signal adjusting section may execute the processing of the adjustment function on the driving signal generated by the driving signal generating section. This configuration allows the driving signal to be suitably adjusted by the adjustment function to supply the adjusted signal to the controlled object.

Further, as shown in FIG. 10, the driving control section may comprise a plurality of the driving signal adjusting sections arranged sequentially. Each of the driving signal adjusting sections may be configured to have the simulated transfer function processing section, the inverse target transfer function processing section, the subtraction processing section, the gain applying section, and the addition processing section. With this configuration, the control according to the present invention can be performed a plurality of times to exert a higher effectiveness on a vibration reducing.

Furthermore, in the driving control section as illustrated in FIG. 11, the plurality of driving signal adjusting sections may have the one common simulated transfer function processing section. An output from the one common simulated transfer function processing section may be supplied to a plurality of inverse target transfer function processing sections provided in the respective driving signal adjusting sections. This enables the use of the common simulated transfer function, thereby the configuration can be simplified.

Moreover, as illustrated in FIG. 15, the driving control section may further include an additional driving signal adjusting section which does not have the inverse target function processing section and which is configured to supply an output from the simulated transfer function processing section to the subtraction processing section. The additional driving signal adjusting section is shown at reference numeral 57 in FIG. 15 and corresponds to the configuration performing the control with K(s)=1. Combination with the control with K(s)=1 enables the transfer function to be appropriately controlled.

Further, as shown in FIG. 15, the driving control section may further include a Q-control section which applies a Q-control gain to a differential of an output from the controlled object or the simulated transfer function processing section, and adds the differential after the gain is applied to the driving signal. Therefore, the Q-control section can be combined with the device to provide a more appropriate transfer function.

Furthermore, the target transfer function may be assumed to be a first-order low pass filter, and "1+differential" may be set as the inverse target transfer function. By setting the inverse target transfer function for "1+differential", the target transfer function can be made approximate to the desirable first-order low pass filter, thereby the effects such as active damping can be appropriately obtained.

Moreover, the controlled object may include a scanner that performs relative scan between the probe and the sample, and the driving control section may control scanning of the scanner. Therefore, resonant vibration of the scanner can be reduced.

Further, the controlled object may include an exciting mechanism for a cantilever in which the probe is provided, and the driving control section may control excitation of the cantilever. Therefore, resonant vibration of the cantilever can be reduced.

Another aspect of the present invention is an active damping driving control apparatus. This apparatus supplies a driving signal to a controlled object and performs active damping control on the controlled object. The active damping driving control apparatus is configured to supply the controlled object with the driving signal processed by an adjustment function that converts the driving signal. The adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function. In this aspect, the present invention is applicable not only to SPMs, their scanners, or the like but also to other controlled objects. The present invention enables the suitable performance of active damping and the control allowing the frequency band to be increased as described above. Further, this aspect may be provided with the above various additional features.

Further, another aspect of the present invention is a transfer function converting device. This device is provided in a driving control apparatus that supplies a driving signal to a controlled object so as to control driving of the controlled object. The device converts a driving operation in accordance with an actual transfer function indicative of an actual frequency characteristic of the controlled object when the driving signal is supplied to the controlled object, into an operation in accordance with a target driving function different from the actual transfer function. This device comprises the simulated transfer function processing section, the inverse target transfer function processing section, the subtraction processing section, the gain applying section and the addition processing section mentioned above. Also in this aspect, the present invention is applicable not only to SPMs, their scanners, or the like but also to other controlled objects. The present invention enables the suitable performance of active damping and the control allowing the frequency band to be increased as described above. This aspect may also be provided with the above various additional features.

Further, the present invention is not limited to the above aspect of an apparatus or device. The present invention may be expressed in other aspects such as a method.

Furthermore, in the above embodiment, the characteristic configuration shown in FIG. 7 etc. is mainly composed of an analog circuit. A similar circuit may be implemented using a digital circuit. Further, the characteristic configuration of the present invention may be implemented using software by allowing an arithmetic apparatus to execute a corresponding program. In this regard, the program is also an aspect of the present invention; the program is executed by an arithmetic apparatus such as a computer to implement the method of the present invention.

While the preferable embodiments of the present invention which are possible at present have been explained, it should be understood that a number of modifications to the present embodiments can be made, and it is intended that such modifications within the true spirit and scope of the present invention are also included in the scope of the appended claim.

INDUSTRIAL APPLICABILITY

The scanning probe microscope according to the present invention is useful as a technique for allowing observation of biological molecules and the like.

The invention claimed is:

1. A scanning probe microscope that performs relative scan between a probe and a sample to observe the sample, comprising:
a controlled object that is a physical structure for driving at least one of the sample and the probe; and
a driving control section for supplying a driving signal to the controlled object to control the controlled object, wherein
the driving control section is configured to supply the controlled object with the driving signal processed by an adjustment function that converts the driving signal, and the adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

2. The scanning probe microscope according to claim 1, wherein
the driving control section subjects the driving signal to processing of the adjustment function so that an output obtained by executing the processing of the simulated transfer function on the adjusted driving signal approximates to an output obtained by executing a target transfer function different from the simulated transfer function on the unadjusted driving signal.

3. The scanning probe microscope according to claim 2, wherein
the driving control section has a driving signal adjusting section for executing the processing of the adjustment function on the driving signal, and the driving signal adjusting section has:
a simulated transfer function processing section for executing the processing of the simulated transfer function on the driving signal;
an inverse target transfer function processing section for executing the processing of an inverse target transfer function on an output from the simulated transfer function processing section, the inverse target transfer function corresponding to an inverse of the target transfer function;
a subtraction processing section for calculating a difference between the driving signal and an output from the inverse target transfer function processing section;
a gain applying section for applying a gain to an output from the subtraction processing section; and
an addition processing section for adding an output from the gain applying section to the driving signal.

4. The scanning probe microscope according to claim 3, comprising
a driving signal generating section for generating the driving signal having a driving waveform corresponding to a driving operation required for the controlled object, wherein
the driving signal adjusting section executes the processing of the adjustment function on the driving signal generated by the driving signal generating section.

5. The scanning probe microscope according to claim 3, wherein
the driving control section comprises a plurality of the driving signal adjusting sections arranged sequentially, and
each of the driving signal adjusting sections has the simulated transfer function processing section, the inverse target transfer function processing section, the subtraction processing section, the gain applying section, and the addition processing section.

6. The scanning probe microscope according to claim 5, wherein
the plurality of driving signal adjusting sections have the one common simulated transfer function processing section, and an output from the one common simulated transfer function processing section is supplied to a plurality of inverse target transfer function processing sections provided in the respective driving signal adjusting sections.

7. The scanning probe microscope according to claim 3, wherein
the driving control section further includes an additional driving signal adjusting section which does not have the inverse target function processing section and which is configured to supply an output from the simulated transfer function processing section to the subtraction processing section.

8. The scanning probe microscope according to claim 3, wherein the driving control section further includes a Q-control section which applies a Q-control gain to a differential of an output from the controlled object or the simulated transfer function processing section and adds the differential after the gain is applied to the driving signal.

9. The scanning probe microscope according to claim 2, wherein
the target transfer function is assumed to be a first-order low pass filter, and "1+differential" is set as the inverse target transfer function.

10. The scanning probe microscope according to claim 1, wherein
the controlled object includes a scanner that performs the relative scan between the probe and the sample, and the driving control section controls scanning of the scanner.

11. The scanning probe microscope according to claim 1, wherein
the controlled object includes an exciting mechanism for a cantilever in which the probe is provided, and
the driving control section controls excitation of the cantilever.

12. An active damping driving control apparatus which supplies a driving signal to a controlled object and which performs active damping control on the controlled object, wherein
the active damping driving control apparatus is configured to supply the controlled object with the driving signal processed by an adjustment function that converts the driving signal, and
the adjustment function adjusts the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

13. A transfer function converting device provided in a driving control apparatus that supplies a driving signal to a controlled object so as to control driving of the controlled object, the device converting a driving operation in accordance with an actual transfer function indicative of an actual frequency characteristic of the controlled object when the driving signal is supplied to the controlled object, into an operation in accordance with a target driving function different from the actual transfer function, the device comprising:

a simulated transfer function processing section for executing the processing of a simulated transfer function simulating the actual transfer function on the driving signal;

an inverse target transfer function processing section for executing the processing of an inverse target transfer function on an output from the simulated transfer function processing section, the inverse target transfer function corresponding to an inverse of the target transfer function;

a subtraction processing section for calculating a difference between the driving signal and an output from the inverse target transfer function processing section;

a gain applying section for applying a gain to an output from the subtraction processing section; and an addition processing section for adding an output from the gain applying section to the driving signal.

14. A driving control method for a scanning probe microscope that performs relative scan between a probe and a sample to observe the sample, the method supplying a driving signal to a controlled object that is a physical structure for driving at least one of the sample and the probe, to control the controlled object, the method comprising:

supplying the controlled object with the driving signal processed by an adjustment function that converts the driving signal, the adjustment function adjusting the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

15. An active damping driving control method that supplies a driving signal to a controlled object to perform active damping control on the controlled object, the method comprising:

supplying the controlled object with the driving signal processed by an adjustment function that converts the driving signal, the adjustment function adjusting the driving signal by using a simulated transfer function that simulates an actual transfer function indicative of an actual frequency characteristic of the controlled object so that executing processing of the simulated transfer function on the adjusted driving signal results in decrease of vibration of an output signal from the simulated transfer function.

16. A transfer function converting method for a driving control device that supplies a driving signal to a controlled object so as to control driving of the controlled object, the method converting a driving operation in accordance with an actual transfer function indicative of an actual frequency characteristic of the controlled object when the driving signal is supplied to the controlled object, into an operation in accordance with a target driving function different from the actual transfer function, comprising:

executing the processing of a simulated transfer function simulating the actual transfer function on the driving signal;

executing the processing of an inverse target transfer function on an output from the simulated transfer function, the inverse target transfer function corresponding to an inverse of the target transfer function;

calculating a difference between the driving signal and an output from the inverse target transfer function;

applying a gain to an output from the difference processing; and adding a resultant signal after the gain is applied to the driving signal.

* * * * *

UNITED STATES PATENT AND TRADEMARK OFFICE
CERTIFICATE OF CORRECTION

PATENT NO. : 7,975,314 B2
APPLICATION NO. : 12/439700
DATED : July 5, 2011
INVENTOR(S) : Ando It is certified that error appears in the above-identified patent and that said Letters Patent is hereby corrected as shown below:

On the Title page, section (57) ABSTRACT, please delete the abstract and replace with the following Examiner's amended abstract:

--Driving control is performed by supplying a Z scanner with a driving signal processed by an adjustment function. The adjustment function adjusts the driving signal by using a simulated transfer function that simulates an actual transfer function indicative of an actual frequency characteristic of the Z scanner so that executing processing of the simulated transfer function on the adjusted driving results in decrease of vibration of an output signal from the simulated transfer function. The adjustment function processing is configured so as to execute processing of the simulated transfer function G(s) on the driving signal, to execute processing of an inverse target transfer function K(s) corresponding to the inverse of the target transfer function on an output from the G(s), to determine the difference between the driving signal and the output of K(s), to apply a gain g to the difference, and to add the signal after the gain is applied to the driving signal. Therefore, the output from the G(s) approximates to the target transfer function which is the inverse of the K(s).--

In Column 12, line 57, please delete "900" and insert therefor --90°--

In Column 14, line 17, after the "=", please insert therefor --1--

Signed and Sealed this
Fourth Day of October, 2011

David J. Kappos
*Director of the United States Patent and Trademark Office*